United States Patent
Wang et al.

(10) Patent No.: US 12,470,976 B2
(45) Date of Patent: Nov. 11, 2025

(54) METHOD AND APPARATUS FOR SCHEME OF CONTROL INFORMATION TRANSMISSION

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 18/145,382

(22) Filed: Dec. 22, 2022

(65) Prior Publication Data

US 2023/0209396 A1 Jun. 29, 2023

(30) Foreign Application Priority Data

Dec. 23, 2021 (CN) .......................... 202111587845.1
Feb. 23, 2022 (CN) .......................... 202210168836.7

(51) Int. Cl.
*H04W 28/02* (2009.01)
*H04W 88/08* (2009.01)

(52) U.S. Cl.
CPC ... *H04W 28/0273* (2013.01); *H04W 28/0284* (2013.01); *H04W 88/08* (2013.01)

(58) Field of Classification Search
None
See application file for complete search history.

(56) References Cited

U.S. PATENT DOCUMENTS

| 11,917,452 | B2* | 2/2024 | Huang | H04W 28/0236 |
| 2021/0152515 | A1 | 5/2021 | Akl et al. | |
| 2021/0168646 | A1* | 6/2021 | Chen | H04W 28/10 |
| 2022/0014976 | A1* | 1/2022 | Luo | H04W 36/0044 |
| 2022/0086936 | A1* | 3/2022 | Akl | H04W 76/15 |
| 2022/0132390 | A1* | 4/2022 | Akl | H04W 72/27 |
| 2022/0232414 | A1* | 7/2022 | Wu | H04L 47/267 |
| 2022/0286841 | A1* | 9/2022 | Mildh | H04W 8/26 |
| 2023/0379792 | A1* | 11/2023 | Muhammad | H04W 40/22 |

(Continued)

OTHER PUBLICATIONS

Samsung, (TP to BL CR of TS38.423) Discussion on inter-donor topology redundancy, R3-214875, 3GPP TSG-RAN WG3 Meeting #114e, Oct. 22, 2021, 14 Pages.

(Continued)

*Primary Examiner* — Lonnie V Sweet
(74) *Attorney, Agent, or Firm* — Jefferson IP Law, LLP

(57) ABSTRACT

The disclosure relates to a fifth generation (5G) or sixth generation (6G) communication system. A method performed by a first integrated access and backhaul (IAB) node which is a F1-terminating IAB donor node in a wireless communication system is provided. The method includes receiving, from a second IAB node which is a non-F1-terminating IAB donor node, a first message including backhaul (BH) related information for at least one IAB node of a non-F1-terminating topology associated with the second IAB node and transmitting, to a third IAB node which is an IAB node connected with the first IAB node and the second IAB node, a second message including configuration information for the third IAB node.

16 Claims, 16 Drawing Sheets

(56) References Cited

U.S. PATENT DOCUMENTS

2024/0349161 A1* 10/2024 Malkamäki ........... H04W 40/02
2025/0081029 A1* 3/2025 Zhuo ................. H04W 28/0278

OTHER PUBLICATIONS

Lenovo et al., Discussion on IAB inter-donor topology redundancy, R3-212165, 3GPP TSG-RAN WG3 Meeting #112e, May 7, 2021, 5 Pages.
ZTE, Discussion on inter-donor topology redundancy, R3-214926, 3GPP TSG-RAN WG3 Meeting #114e, Oct. 22, 2021, 9 Pages.
Ericsson, Inter-Donor Routing in IAB Topology Redundancy Scenarios, R3-214824, 3GPP TSG-RAN WG3 Meeting #114e, Oct. 22, 2021, 4 Pages.
International Search Report dated Mar. 22, 2023, issued in International Application No. PCT/KR2022/021098, 7 Pages.
Extended European Search Report dated Feb. 5, 2025; European Appln. No. 22911990.4-1206 / 4434255 PCT/KR2022021098.

* cited by examiner

Exemplary scenario I : dual-connection scenario

Exemplary scenario II : single-connection scenario

METHOD AND APPARATUS FOR SCHEME OF CONTROL INFORMATION TRANSMISSION

CROSS-REFERENCE TO RELATED APPLICATION(S)

This application is based on and claims priority under 35 U.S.C. § 119 (a) of a Chinese patent application number 202111587845.1, filed on Dec. 23, 2021, in the Chinese Intellectual Property Office, and of a Chinese patent application number 202210168836.7, filed on Feb. 23, 2022, in the Chinese Intellectual Property Office, the disclosure of each of which is incorporated by reference herein in its entirety.

1. Field

The disclosure relates to a field of communications. More particularly, the disclosure relates to a node and a method thereof.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, New Radio (NR) User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for scheme of control information transmission.

Additional aspects will be set forth in part in the description which follows and, in part, will be apparent from the description, or may be learned by practice of the presented embodiments.

In accordance with an aspect of the disclosure, a method performed by a first integrated access and backhaul (IAB) node which is a F1-terminating IAB donor node in a wireless communication system is provided. The method includes receiving, from a second IAB node which is a non-F1-terminating IAB donor node, a first message including backhaul (BH) related information for at least one IAB node of a non-F1-terminating topology associated with the second IAB node, and transmitting, to a third IAB node which is an IAB node connected with the first IAB node and the second IAB node, a second message including configuration information for the third IAB node.

In accordance with an aspect of the disclosure, a method performed by a second integrated access and backhaul (IAB) node which is a non-F1-terminating IAB donor node in a wireless communication system is provided. The method includes transmitting, to a first IAB node which is a F1-terminating IAB donor node, a first message including backhaul (BH) related information for at least one IAB node of a non-F1-terminating topology associated with the second IAB node, wherein the first message is for transmitting the configuration information to a third IAB node which is an IAB node connected with the first IAB node and the second IAB node.

In accordance with an aspect of the disclosure, a first integrated access and backhaul (IAB) node which is a F1-terminating IAB donor node in wireless communication is provided. The first IAB node includes a transceiver, and at least one processor coupled with the transceiver and configured to receive, from a second IAB node which is a non-F1-terminating IAB donor node, a first message including backhaul (BH) related information for at least one IAB node of a non-F1-terminating topology associated with the second IAB node, and transmit, to a third IAB node which is an IAB node connected with the first IAB node and the second IAB node, a second message including configuration information for the third IAB node.

In accordance with an aspect of the disclosure, a second integrated access and backhaul (IAB) node which is a non-F1-terminating IAB donor node in wireless communication is provided. The second IAB node includes a transceiver, and at least one processor coupled with the transceiver and configured to transmit, to a first IAB node which is a F1-terminating IAB donor node, a first message including backhaul (BH) related information for at least one IAB node of a non-F1-terminating topology associated with the second IAB node, wherein the first message is for transmitting the configuration information to a third IAB node which is an IAB node connected with the first IAB node and the second IAB node.

In accordance with an aspect of the present disclosure, there is provided a method executed by a first network node. The method may include: sending, by the first network node to a second network node, a first message, wherein, the first message is related to notifying a status of a network controlled by the first network node, or is used to configure control information of a relay node, or is used to request to revoke or release traffics. In an embodiment, the first network node may be a second node or a third node. In an embodiment, when the first network node is the second node and the second network node is the third node, the relay node may be a first node or a fourth node. In another embodiment, when the first network node is the third node and the second network node is the second node, the relay node may be the first node or a fifth node.

In accordance with an embodiment, the method may further include: receiving, by the first network node from the fourth node, a message for notifying a network condition of the fourth node, wherein, the message at least may include one of information below: second indication information of a congested link, second indication information of a congested cell group, second indication information of a congested cell, second indication information of a congested route/path, and second indication information of a congested channel. In an embodiment, the first network node may be the third node.

In accordance with an embodiment, the method may further include: receiving, by the first network node from the first node, a message for notifying a network condition of the first node, wherein, the message at least may include one of information below: fourth indication information of a congested link, fourth indication information of a congested cell group, fourth indication information of a congested cell, fourth indication information of a congested route/path, and fourth indication information of a congested channel. In an embodiment, the first network node may be the second node.

In accordance with another aspect of the present disclosure, there is further provided a method executed by a second network node. The method may include: receiving, from a first network node, a first message, wherein, the first message is related to notifying a condition of a network controlled by the first network node, or is used to configure control information of a relay node, or is used to revoke or release traffics. In an embodiment, the first network node may be a second node or a third node. In an embodiment, when the first network node is the second node and the second network node is the third node, the relay node may be a first node or a fourth node. In another embodiment, when the first network node is the third node and the second network node is the second node, the relay node may be the first node or a fifth node.

In accordance with an embodiment, the method may further include: sending, by the second network node to a third network node, a second message, wherein, the second message is related to configuration of data transmission or is related to configuration of control information. In an embodiment, when the second network node is the second node and the first network node is the third node, the third network node may be the fifth node or the first node. In another embodiment, when the second network node is the third node and the first network node is the second node, the third network node may be the fourth node or the first node. In an embodiment, when the second network node is the second node, the third network node may be a sixth node; and in an embodiment, when the second network node is the third node, the third network node may be a seventh node.

In accordance with an embodiment, in the method, when the first message is related to notifying a condition of a network controlled by the first network node, the first message at least may include one of information below: congestion indication information, indication information of a congested node, indication information of a congested cell group, indication information of a congested cell, indication information of a congested route/path, indication information of a congested channel, and indication information of a congested link. In an embodiment, a congested node may be a node where congestion occurs, for example, may be a controlled relay node (e.g., an IAB node).

In accordance with an embodiment, in the method, when the first message is used to configure control information of the relay node, the first message at least may include one of information below: threshold configuration information, report configuration indication information, and channel indication information.

In accordance with an embodiment, in the method, when the first message is used to revoke or release traffics, the first message at least may include one of information below: traffic information and configuration information of data.

In accordance with an embodiment, in the method, when the second message is related to configuration of data transmission, the second message at least may include one of information below: indication information of data, congestion notification information, and configuration information of data transmission.

In accordance with an embodiment, in the method, when the second message is related to configuration of control information, the second message at least may include one of information below: indication information of control information transmission, report configuration indication information, and threshold configuration information.

In accordance with an embodiment, the method may further include: sending, by the second network node to the sixth node, a message for configuring data transmission of the sixth node, wherein, the message at least may include one of information below: indication information of data, congestion notification information and configuration information of data transmission. In an embodiment, when the first network node is the third node and the second network node is the second node, the message for configuring data transmission of the sixth node is sent by the second network node to the sixth node. In the above-described embodiment, the second node may be a control plane portion of a central unit of a base station, and the sixth node may be a user plane portion of the central unit of the base station.

In another embodiment, the method may further include: sending, by the second network node to the seventh node, a message for configuring data transmission of the seventh node, wherein, the message at least may include one of information below: indication information of data, congestion notification information, and configuration information of data transmission. In the above-described embodiment, the third node may be a central unit of a base station or a control plane portion of the central unit of the base station, and the seventh node may be a distributed unit of the base station. The first network node may be the second node, and the second network node may be the third node.

In accordance with an embodiment, in the method, the threshold configuration information at least may include one of information below: indication information of a threshold value, first granularity indication information, and first indication information of an applicable node; and in the method, the report configuration indication information at least may include one of information below: second granularity indication information and second indication information of an applicable node.

In accordance with an embodiment, the method may further include: sending, by the second network node to the fourth node, a message for providing relevant configuration information for receiving the control information reported by the first node, wherein, the message may at least include threshold configuration information. In an embodiment, the second network node may be the third node and the first network node may be the second node.

In accordance with an embodiment, the method may further include: sending, by the second network node to the first node, a message for providing configuration information required for reporting the control information, wherein, the message may at least include report configuration indication information. In an embodiment, the second network node may be the third node and the first network node may be the second node.

In accordance with an embodiment, the method may further include: sending, by the second network node to the fifth node, a message for providing relevant configuration information for receiving control information reported by another node, wherein, the message may at least include threshold configuration information. In an embodiment, the second network node may be the second node and the first network node may be the third node.

In accordance with an embodiment, the method may further include: sending, by the second network node to the first node, a message for configuring transmission of the control information of the first node, wherein, the message at least may include one of information below: indication information of control information transmission and report configuration indication information. In an embodiment, the second network node may be the second node and the first network node may be the third node.

In accordance with an embodiment, in the method, the indication information of control information transmission at least may include one of information below: indication information of a type of control information, channel indication information and topology indication information.

In accordance with an embodiment, in the method, the indication information of data at least may include one of information below: indication information of a bearer, indication information of a tunnel, indication information of an address, indication information of a header, indication information of a route/path, and indication information of a channel.

In accordance with another aspect of the present disclosure, there is further provided a node. The node may include: a memory, configured to store a computer program; and a controller, configured to execute the computer program to implement the above-described methods.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
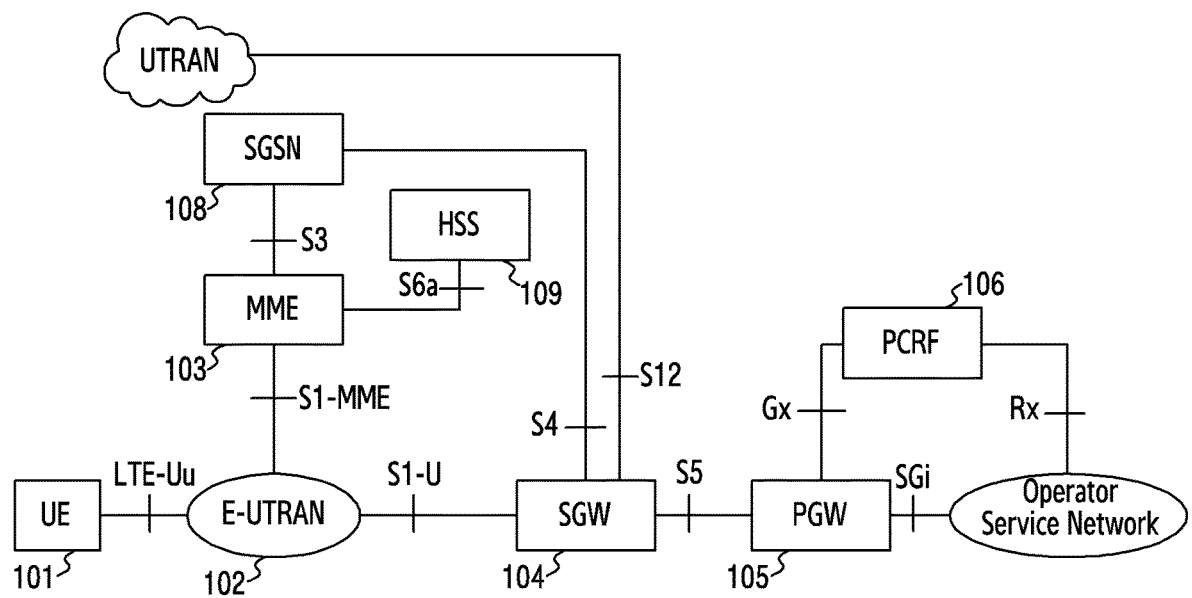
FIG. 1 is an system architecture of System Architecture Evolution (SAE)

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinarily skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms of "a", "an" and "the" include plural referents unless the context clearly dictates otherwise. Thus, for example, reference to "a component surface" includes reference to one or more of such surfaces. The terms "include" or "may include" refer to presence of a correspondingly disclosed function, operation, or component that may be used in various embodiments of the present disclosure, rather than limiting presence of one or more additional functions, operations, or features. Furthermore, the terms "comprise" or "have" may be construed to indicate certain characteristics, numbers, steps, operations, constituent elements, components, or combinations thereof, but should not be construed as excluding possibility of presence of one or more other characteristics, numbers, steps, operations, constituent elements, components, or combinations thereof.

It should be further understood that the term "comprise/comprising" used in the specification of the disclosure specifies the presence of the stated features, integers, steps, operations, elements and/or components, but not exclusive of the presence or addition of one or more other features, integers, steps, operations, elements, components and/or combinations thereof. It should be understood that, when a component is referred to as being "connected" or "coupled" to another component, this element may be directly connected or coupled to the another element, or there may be intervening elements therebetween. In addition, as used herein, the "connection" or "coupling" may comprise wireless connection or wireless coupling. As used herein, the term "and/or" comprises all or any of one or more associated listed items or combinations thereof.

The term "or" as used in various embodiments of the present disclosure includes any of the listed terms and all combinations thereof. For example, "A or B" may include A, or may include B, or may include both A and B.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Unless defined differently, all terms (including technical or scientific terms) used in the present disclosure have the same meaning as understood by those ordinarily skilled in the art according to the present disclosure. Common terms as defined in dictionaries are to be construed to have meanings consistent with the context in the relevant technical field, and should not be construed ideally or overly formalized unless explicitly so defined in the present disclosure.

FIGS. 1, 2, 3A, 3B, 3C, 4, 5A, 5B, 6, 7, 8, 9, 10A, 10B, 10C, 11, and 12 and the various embodiments used to describe the principles of the present disclosure in this patent document discussed below are for illustration only and should not be construed in any way to limit the scope of the present disclosure. Those skilled in the art will understand that the principles of the present disclosure may be implemented in any suitably arranged system or device.

In a New Radio (NR) access network, in order to expand coverage of the network, a relay network architecture is proposed, that is, Integrated Access and Backhaul (IAB). The architecture introduces a donor/anchor node and a relay node (e.g., an IAB node). The donor node may be a stand-alone base station, or may also be a base station composed of a Central Unit (CU) and a Distributed Unit (DU). The relay node includes a mobile terminal function and a distributed unit function. In another example, it may also be described that, the relay node includes a mobile terminal portion (hereinafter referred to as an MT portion) and a distributed unit portion (hereinafter referred to as DU portion), wherein, the mobile terminal portion is configured to communicate with an upper-level node of the relay node, the distributed unit portion is configured to communicate with a lower-level node of the relay node, and the distributed unit portion sets up connection with the donor node and serves users accessing the distributed unit portion. The network including the IAB node is a relay network; in order to further expand network coverage, the current research begins to consider movement of the relay node, for example, deploying a relay node on a vehicle, so that the relay node provides service for users on the vehicle.

FIG. 1 is a system architecture 100 of System Architecture Evolution (SAE).

As shown in FIG. 1, A User Equipment (UE) 101 is a terminal device configured to receive data. An Evolved Universal Terrestrial Radio Access Network (E-UTRAN) 102 is a radio access network including a macro base station (eNodeB/NodeB) that provides the UE with a radio network interface. A Mobility Management Entity (MME) 103 is responsible for managing the UE's mobility context, session context and security information. A Serving Gateway (SGW) 104 mainly provides functions of a user plane; and the MME 103 and the SGW 104 may be located in a same physical entity. A Packet data network GateWay (PGW) 105 is responsible for functions such as charging and lawful monitoring, or may also be located in a same physical entity as the SGW 104. A Policy and Charging Rules Function (PCRF) entity 106 provides Quality of Service (QOS) policies and charging criteria. A Serving GPRS Support Node (SGSN) 108 is a network node device that provides routes for transmission of data in a Universal Mobile Telecommunications System (UMTS). A Home Subscriber Server (HSS) 109 is a home subsystem of the UE, and is responsible for protecting user information including current location of user equipment, address of serving node, user security information, and packet data context of user equipment, etc.

Figure 2:
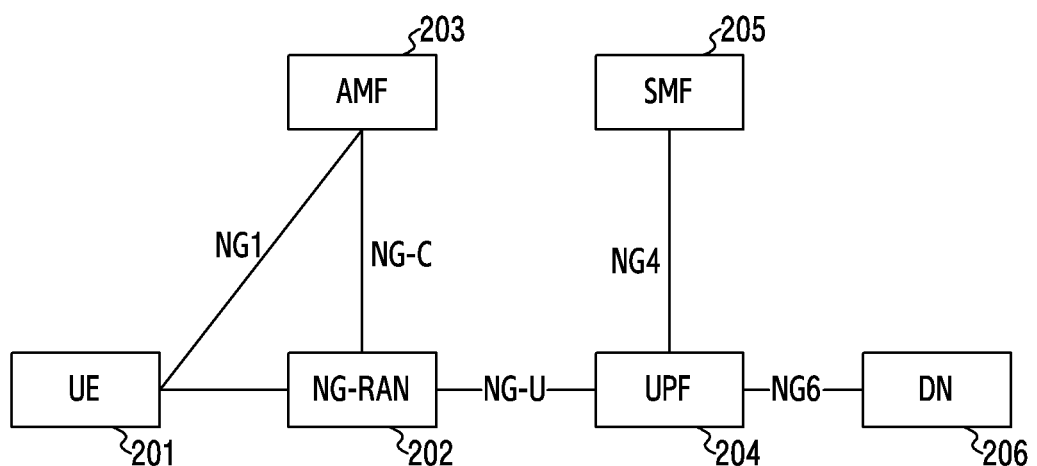
FIG. 2 is an example of an system architecture according to an embodiment of the present disclosure.

FIG. 2 is an example of a system architecture 200 according to various embodiments of the present disclosure. Other embodiments of system architecture 200 may be used without departing from the scope of the present disclosure.

As shown in FIG. 2, the User Equipment (UE) 201 is a terminal device for receiving data. A Next Generation Radio Access Network (NG-RAN) 202 is a radio access network including a base station (a gNB or an eNB) coupled to a 5G core (5GC) network 5GC, wherein, the eNB coupled to the 5GC is also referred to as ng-gNB) that provides the UE with a radio network interface. An Access control and Mobility management Function (AMF) entity 203 is responsible for managing the UE's mobility context and security information. A User plane Function (UPF) entity 204 mainly provides functions of the user plane. A Session Management Function (SMF) entity 205 is responsible for session management. A Data Network (DN) 206 includes, for example, service of operator, access to internet, and third-party service, etc. However, the components of the UE 201 and 5GC are not limited thereto. For example, the UE 201 and 5GC may include more or fewer components than those described above. In addition, the UE 201 corresponds to the UE of the FIG. 13. And the 5GC corresponds to the network entity of the FIG. 12.

Figure 3:
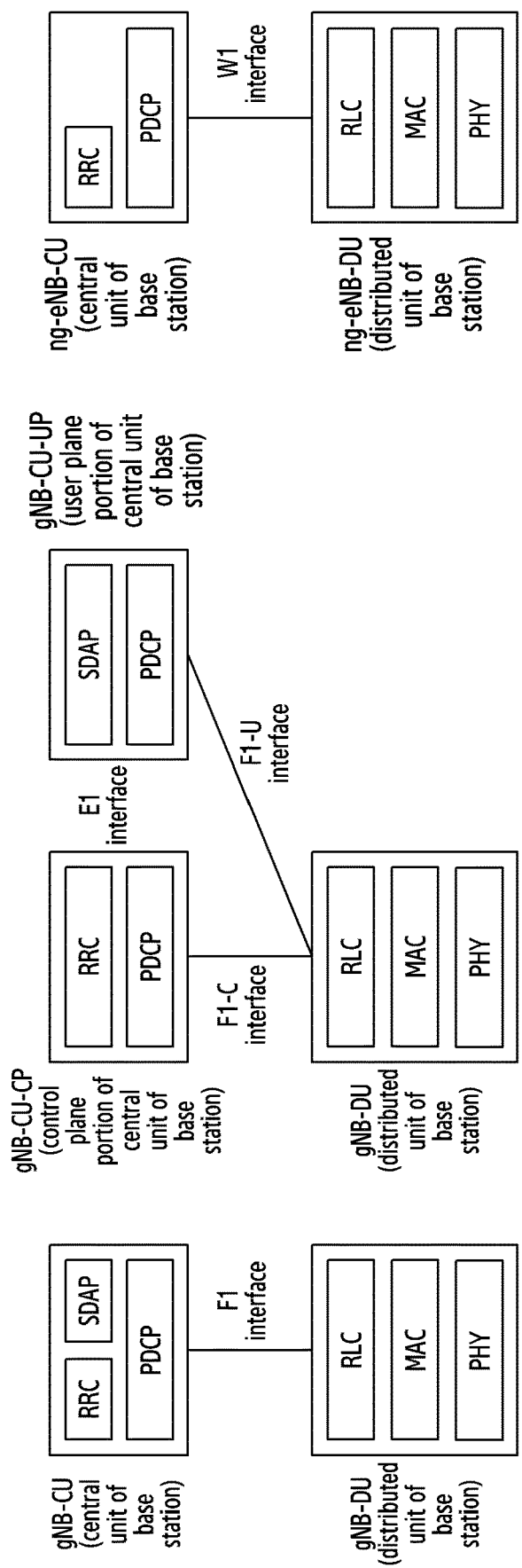
FIG. 3A is an example of a base station structure according to an embodiment of the present disclosure.
FIG. 3B is an example of a base station structure according to an embodiment of the present disclosure.
FIG. 3C is an example of a base station structure according to an embodiment of the present disclosure.

FIG. 3A to 3C is an example of a base station structure according to an embodiment of the present disclosure.

As shown in FIG. 3A, in the NR system, in order to support network function virtualization, more efficient resource management and scheduling, the base station (gNB/ng-eNB) that provides a terminal (UE) with a radio network interface may be further divided into a central unit gNB-CU/ng-eNB-CU (gNB central unit/ng-eNB central unit) and a distributed unit gNB-DU/ng-eNB-DU (gNB distributed unit/ng-eNB distributed unit) (briefly referred to as a CU and a DU in the present disclosure). The gNB-CU has Radio Resource Control (RRC), Service Data Adaptation Protocol (SDAP) and Packet Data Convergence Protocol (PDCP) layers, etc. The gNB-DU has Radio Link Control (RLC), Medium Access Control (MAC) and Physical (PHY) layers, etc. Between the gNB-CU and the gNB-DU is a standardized public interface F1. Further, the F1 interface is divided into an F1-C interface of a control plane portion and an F1-U interface of a user plane portion. A transmission network layer of the F1-C interface transmits based on the Internet Protocol (IP). In order to transmit signaling more reliably, the Stream Control Transmission Protocol (SCTP) is added above the IP. A protocol of the application layer is F1AP, referring to 3GPP TS38.473. The SCTP may provide reliable application layer message transmission. A transmission layer of the F1-U interface is the User Datagram Protocol (UDP)/IP, the General Packet Radio Service (GPRS) Tunnel Protocol ((GTP)-U is above the UDP/IP and is configured to carry a Protocol Data Unit (PDU) of the user plane.

As shown in FIG. 3B, with respect to gNB-CU, the gNB-CU may include a control plane portion of a central unit of a base station (gNB-CU-CP) and a user plane portion of a central unit of a base station (gNB-CU-UP); the gNB-CU-CP contains functions of the control plane of the base station, has RRC and PDCP protocol layers; the gNB-CU-UP contains functions of the user plane of the base station, has SDAP and PDCP protocol layers. Between gNB-CU-CP and gNB-CU-UP is a standardized public interface E1, and the protocol used is E1AP, referring to 3GPP TS38.463. An interface between the control plane portion of the central unit of the base station and the distributed unit of the base station is an F1-C interface, that is, a control plane interface of F1; and an interface between the user plane portion of the central unit of the base station and the distributed unit of the base station is an F1-U interface, that is, a user plane interface of F1.

As shown in FIG. 3C, in the NR system, the base station that accesses the 5G core network and provides the E-UTRA user plane and control plane is referred to as ng-eNB; in order to support virtualization, such base station (ng-eNB) may also be further divided into a central unit ng-eNB-CU (ng-eNB central unit) and a distributed unit ng-eNB-DU (ng-eNB distributed unit) (abbreviated as CU and DU in the present disclosure). The ng-eNB-CU has RRC and PDCP layers. The ng-eNB-DU has RLC, MAC and physical layers, etc. Between the ng-eNB-CU and the ng-eNB-DU is a standardized public interface W1. The W1 interface is divided into a W1-C interface of the control plane portion and a W1-U interface of the user plane portion (not shown). A transmission network layer of the W1-C interface transmits based on the IP. In order to transmit signaling more reliably, the SCTP protocol is added above the IP. A protocol of the application layer is W1AP, referring to 3GPP TS37.473. A transmission layer of the W1-U interface is UDP/IP; and the GTP-U is above the UDP/IP and is configured to carry the PDU of the user plane. However, the components of the base station are not limited thereto. For example, the base station may include more or fewer components than those described above. In addition, the base station corresponds to the base station of the FIG. 11.

Figure 4:
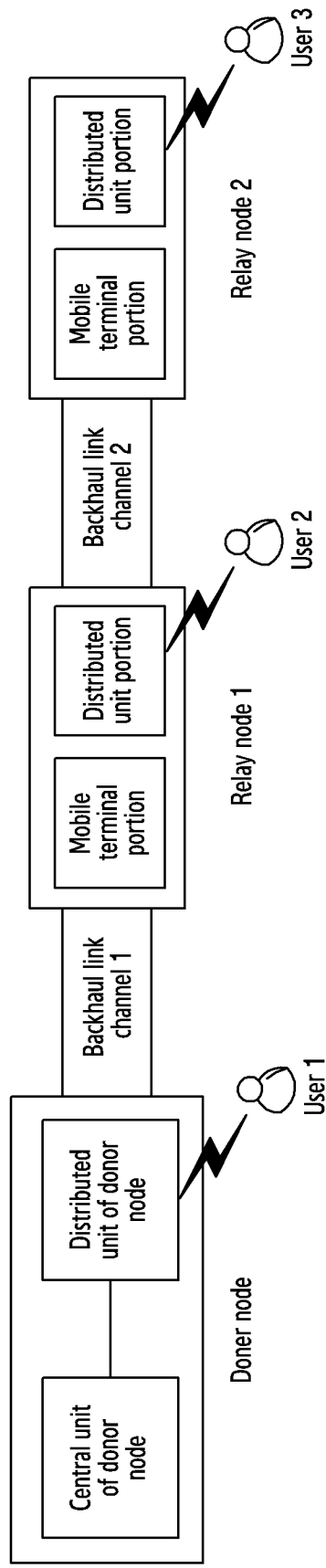
FIG. 4 is an example of a relay network according to an embodiment of the present disclosure.

FIG. 4 is an example of a relay network according to an embodiment of the present disclosure.

As shown in FIG. 4, FIG. 4 shows a schematic architecture of a multi-hop relay network (an IAB network); and a network architecture including a donor node (e.g., an IAB donor/anchor) and two relay nodes (e.g., IAB nodes) is given in the diagram. Users in the multi-hop relay network may access the network through the donor node or a distributed unit of the donor node or the relay node; for example, user 1/2/3 respectively access the relay network through a distributed unit of a donor node, a distributed unit portion of a relay node 1, and a distributed unit portion of a relay node 2. A mobile terminal portion of the relay node is configured to communicate with an upper-level node of the relay node (e.g., a mobile terminal portion of the relay node 1 is configured to communicate with the donor node or the distributed unit of the donor node; and a mobile terminal portion of the relay node 2 is configured to communicate with a distributed unit portion of the relay node 1); a distributed unit portion of the relay node is configured to communicate with a lower-level node of the relay node (e.g., a distributed unit portion of the relay node 1 is configured to communicate with the user 2, or may also be configured to communicate with the mobile terminal portion of the relay node 2). The mobile terminal portion of the relay node may be regarded as a user accessing the network, so it has functions of an ordinary user (a non-relay node) (e.g., the mobile terminal portion may set up a Signaling Radio Bearer (SRB) with a upper-level node thereof to send a Radio Resource Control (RRC) message, or may also set up a Data Radio Bearer (DRB) to send data). Protocol stacks included in the central unit of the donor node include: protocol stacks serving the control plane, including an RRC protocol layer and a PDCP layer; and protocol stacks serving the user plane, including a SDAP layer and a PDCP layer. The protocol stacks included in the distributed unit of the donor node or the distributed unit portion of the relay node include: protocol stacks serving the control plane and the user plane, including an RLC protocol layer, a MAC protocol layer, and a physical PHY layer. An interface between the central unit of the donor node and the distributed unit of the donor node, and between the central unit of the donor node and the distributed unit portion of the relay node is an F1 interface (referring to 3GPP TS38.473).

In the relay network, a link between the relay node and the donor node or the distributed unit of the donor node, or between the relay nodes is a backhaul link; on the backhaul link, one or more different backhaul link channels will be set up, for example, a backhaul link channel 1 and a backhaul link channel 2 in FIG. 4, wherein, the backhaul link channel 1 is located between the donor node and the relay node 1, and the backhaul link channel 2 is located between the relay node 1 and the relay node 2. An example of the backhaul link channel is a backhaul link RLC channel, that is, a backhaul RLC channel. In a relay network, each backhaul link channel is configured to send data packets belonging to a same user or different users. The data packet may be a data packet of a user DRB, or may also be a data packet of a user SRB, or may also be a data packet of the control plane on the F1 interface, or may also be a data packet of the user plane on the F1 interface, or may also be a data packet of a non-F1 interface (e.g., an Internet Protocol Security (IPSec) data packet, an SCTP protocol data packet, an Operation Administration and Maintenance (OAM) data packet, etc.).

In order to implement transmission of user data in the multi-hop relay network, 3GPP defines a new protocol layer, that is, a Backhaul Adaptation Protocol (BAP) layer; the protocol layer will be configured in the distributed unit of the donor node and the relay node (e.g., the mobile terminal portion of the relay node, and/or the distributed unit portion of the relay node), be located above the RLC layer, and has a main function of routing of data packets and mapping of data packets. In order to transmit user data between the relay node and the donor node, it is necessary to complete a configuration of the backhaul link and a configuration of the F1 interface between the distributed unit portion of the relay node and the donor node; these configurations include but are not limited to types below: for example, a BAP address, a route configuration (e.g., routing identity information, wherein, the information indicates different transmission routes, and includes a BAP address and a path identity of a target receiving node), a configuration of the backhaul link channel, a configuration of the tunnel, a backhaul link configuration with respect to the tunnel, etc.

In the relay network, some control information will be transmitted between nodes, for example, the relay node will report an available buffer size to an upper-level node connected therewith (a parent node); the relay node will notify other nodes of a link condition thereof; and the relay node will report congestion information to the central unit of the base station. Such information is beneficial for the receiving node to learn the condition of the relay node (e.g., whether it is congested, whether there is a link failure, etc.); and such information may help the donor node to control transmission of data in the network and avoid data loss and congestion.

Before introducing specific embodiments, some assumptions and some definitions of the present disclosure are given below.

The message names in the present disclosure are just examples, and other message names may also be used.

"First", "second", etc. included in the message names of the present disclosure are just examples of the messages, and do not represent an execution order.

Detailed descriptions of steps irrelevant to the present disclosure are omitted in the present disclosure.

In the present disclosure, steps in respective flows may be executed in combination with each other, or may also be executed separately. The execution order of the steps in respective flows is just an example, and other possible execution orders are not excluded.

In the present disclosure, the base station may be a 5G base station (e.g., a gNB, a ng-eNB), or may also be a 4G base station (e.g., an eNB), or may also be other types of accessing nodes.

In the present disclosure, transmission of data refers to receiving or transmitting of data.

In the present disclosure, uplink data refers to data sent by the relay node to the base station (the donor node), and downlink data refers to data sent by the base station (the donor node) to the relay node.

In the present disclosure, a structure of the relay node referred to includes a mobile terminal portion and a distributed unit portion; and the interface between the distributed unit portion of the relay node and the donor node (or the central unit of the donor node) is the F1 interface. However, the solution of the present disclosure is also applicable to relay nodes of other structures. In an embodiment, another possible structure of the relay node is one that includes a mobile terminal portion and a base station portion; and an interface between the base station portion and the donor node (or the central unit of the donor node) is an Xn/X2 interface.

The nodes involved in the present disclosure include:

First node: a relay node; wherein, the node includes two portions; a first portion is configured for the relay node to access the network, and is referred to as a first entity of the first node; and a second portion is configured to serve users, and is referred to as a second entity of the first node. In an example, the relay node is an IAB node, that is, it includes an MT portion and a DU portion; then the first entity of the first node is the MT portion, and the second entity of the first node is the DU portion; in another embodiment, the relay node is a node having a base station function, for example, including an MT portion and a base station portion, then the first entity of the first node is the MT portion, and the second entity of the first node is the base station portion.

Second node: a base station, or a central unit of a base station, or a control plane portion of a central unit of a base station; wherein, the second node is a node with which the first node is connected; and in an embodiment, the second node is a node that sets up an RRC connection with the first node (or the first entity of the first node); in another embodiment, the second node is a node that sets up an interface (e.g., an F1 interface, an Xn/X2 interface) with the first node (the second entity of the first node); and in another embodiment, the second node is a node that not only sets up an interface but also sets up an RRC connection with the first node. Specifically, the second node may be a donor node of the first node, or may also be a node having a donor node function.

Third node: a base station, or a central unit of a base station, or a control plane portion of a central unit of a base station; wherein, the third node is a node with which the first node is connected; in an embodiment, the third node is a node that sets up an RRC connection with the first node (or the first entity of the first node); in another embodiment, the third node is a node that sets up an interface (e.g., an F1 interface, an Xn/X2 interface) with the first node (the second entity of the first node); and in another embodiment, the third node is a node that not only sets up an interface but also sets up an RRC connection with the first node. Specifically, the third node may be a donor node of the first node, or may also be a node having a donor node function.

Fourth node: a relay node; wherein, the node includes two portions; a first portion is configured for the relay node to access the network, and is referred to as a first entity of the fourth node; and a second portion is configured to serve users, and is referred to as a second entity of the fourth node. In an example, the relay node is an IAB node, that is, it includes an MT portion and a DU portion; then the first entity of the fourth node is the MT portion, and the second entity of the fourth node is the DU portion; in another embodiment, the relay node is a node having a base station function, for example, including an MT portion and a base station portion, then the first entity of the fourth node is the MT portion, and the second entity of the fourth node is the base station portion; and in an embodiment, the fourth node is a parent node of the first node, that is, the first node will send data to the fourth node, which is further sent out by the fourth node; or the data sent to the first node will be sent to the fourth node firstly, and then sent by the fourth node to the first node.

In description below, it is illustrated by taking the first node as an IAB node for an example, and then the interface set up by the second entity of the first node is an F1 interface. However, the solutions as described in the present disclosure are applicable to other types of relay nodes, and description below about the F1 interface is also applicable to other types of interfaces set up by the second entity of the first node with the second node/the third node.

Figure 5A:
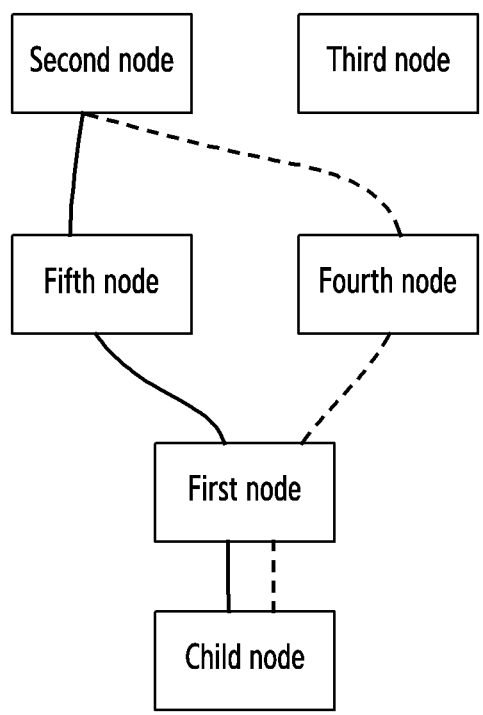
FIG. 5A is an example of a scenario considered by the present disclosure.
Figure 5B:
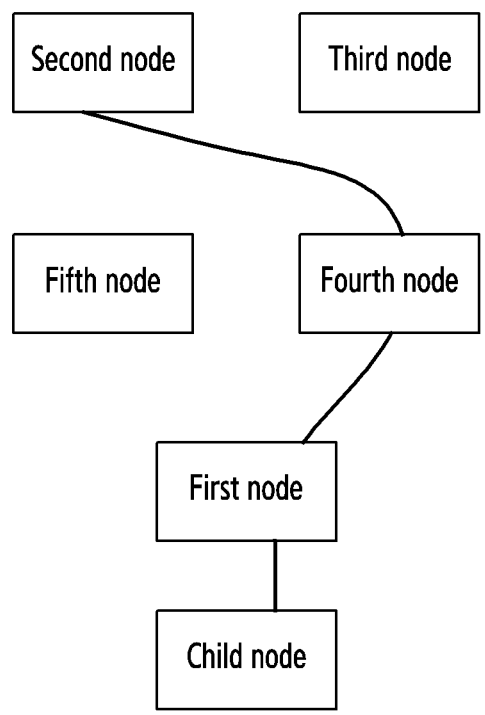
FIG. 5B is an example of a scenario considered by the present disclosure.

FIG. 5A-5B is an example of a scenario considered by the present disclosure.

The present disclosure involves two scenarios below, as shown in FIG. 5:

Scenario I: A Dual-Connection Scenario

As shown in FIG. 5A, the first node (or the mobile terminal portion of the first node) sets up a dual-connection with the second node and the third node; there are one or more intermediate nodes between the first node and the second node (for illustration, only one intermediate node, namely, the fifth node, is given in the diagram, and this node may be a relay node, or may also be a distributed unit of a base station); and there are one or more intermediate nodes between the first node and the third node (for illustration, only one intermediate node, namely, the fourth node, is given in the diagram, and this node may be a relay node, or may also be a distributed unit of a base station). In addition, the first node may also have one or more child nodes directly or indirectly connected therewith (for illustration, only one child node is given in the diagram, and the child node is a relay node). Data of the first node (or the distributed unit portion of the first node) and/or the child node (or the distributed unit portion of the child node) may be transmitted through two different paths. One path is a path in a network managed by the second node (as shown by a solid line in FIG. 5A); in the diagram, the network includes the fifth node; in an actual system, the network between the first node and the second node has one or more different nodes; and the network is managed by the second node. The other path is a path in a network managed by the third node (shown by a dashed line in FIG. 5A); in the diagram, the network includes the fourth node; in an actual system, the network between the first node and the third node has one or more different nodes; the network is managed by the third node; and if the third node is a central unit of a base station, then data of the path will not pass through the third node.

Scenario II: A Single Connection Scenario

As shown in FIG. 5B, the first node (or the mobile terminal portion of the first node) sets up a single connection with the third node; and the first node (or the distributed unit portion of the first node) sets up an interface (e.g., an F1 interface) with the second node. There are one or more intermediate nodes between the first node and the third node (for illustration, only one intermediate node is given in the diagram, namely, the fourth node, the node may be a relay node, or may also be a distributed unit of a base station). In such scenario, data on the interface between the first node (or the distributed unit portion of the first node) or the child node (or the distributed unit portion of the child node) and the second node will only pass through one path (shown by a solid line in FIG. 5B) for transmission, that is, such kind of path belongs to the network managed by the third node; in the diagram, the network includes the fourth node; in an actual system, the network between the first node and the third node has one or more different nodes; the network is managed by the third node; and if the third node is a central unit of the base station, data of the path will not pass through the third node.

In a relay network, a congestion condition may occur in a relay node (e.g., too much data buffered on the relay node); if a control entity of the network (e.g., the central unit of the base station) or the parent node of the relay node does not take any measures, the buffer of the relay node will overflow, resulting in data loss. Therefore, solving the congestion problem of the relay node is an important research topic. The prior art mainly adopts two methods to solve the congestion problem: 1) control plane congestion control: the relay node reports a congestion condition to a donor node connected therewith (e.g., a node that has an interface with the relay node), and then the donor node solves the congestion problem of the relay node; and 2) single-hop congestion control: the relay node reports a congestion condition, for example, an available buffer size of the relay node, to a parent node thereof, and then the parent node solves the congestion problem of the relay node. In the two methods, both the relay node and the parent node thereof are controlled by one node (both the relay node and the parent node are connected to a same donor node), so the donor node may uniformly adjust transmission of data in the network, to further solve the congestion problem well. However, in the two scenarios concerned by the present disclosure, the third node that controls the relay node data transmission network and the second node that controls the relay node (or the distributed unit portion of the relay node) are not a same node, for example, in scenario I, a portion of data of the first node and a child node thereof will be transmitted through the network controlled by the third node, but the first node (or the distributed unit portion of the first node) and a child node thereof (or the distributed unit portion of the child node) are controlled by the second node; for another example, in scenario II, all data of the first node and the child node thereof will be transmitted through the network controlled by the third node, but the first node (or the distributed unit portion of the first node) and the child node thereof (or the distributed unit portion of the child node) are controlled by the second node. This will cause problems below:

Problem 1: the congestion condition is unknown. For example, the third node cannot learn congestion of the first node and the child node thereof. This is because congestion of the first node and the child node thereof is reported to the second node. The second node cannot learn congestion of the parent node of the first node (e.g., the fourth node), this is because congestion of the fourth node is reported to the third node.

Problem 2: configuration of control information at the nodes cannot be coordinated, for example, configuration of the first node is completely controlled by the second node, so the third node cannot learn configuration of the first node; configuration of the fourth node is completely controlled by the third node, so the second node cannot learn configuration of the fourth node, which results in inconsistent or unknowable configuration of the control information.

In addition, one of purposes of the above-described scenarios I and II may be: to transfer some or all traffics of the first node and/or the child node thereof served by the second node into the network (topology) served by the third node, which, thus, may reduce load on the network (topology) served by the second node. These two scenarios may occur because the network (topology) served by the first node is overloaded, but when load on the network served by the first node is relieved, those traffics transferred to the network (topology) served by the third node may be revoked by the second node, i.e. these transferred traffics are transferred back to the network (topology) served by the second node; or when there is a problem with the network served by the third node (e.g. congestion, link failure, etc.), the third node may also transfer these transferred traffics back to the network (topology) served by the second node. In the present disclosure, the above-described process, that is, the process of transferring traffics transferred from the network (topology) served by the second node to the network (topology) served by the third node back to the network (topology) served by the second node is referred to as traffic revoking/revocation or traffic migration revoking/revocation. In order to implement the process, problems below will arise:

Problem 3: whether traffic revoking/revocation or traffic migration revoking/revocation is triggered by the second node or the third node; and in the process, how to indicate traffics need to be transferred back to the network (topology) served by the second node.

Figure 6:
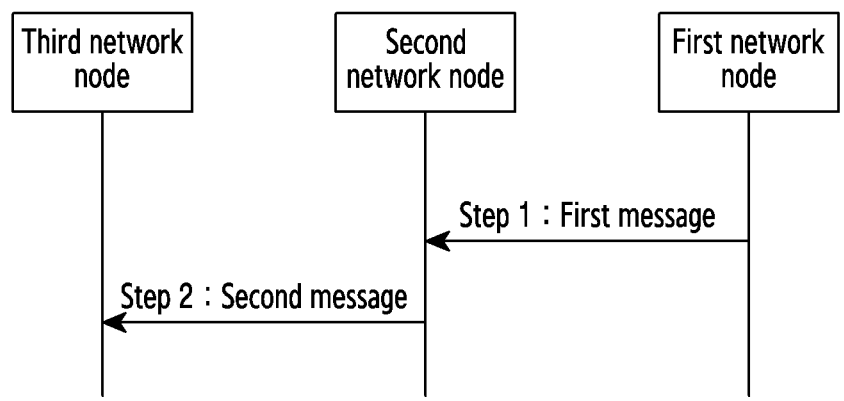
FIG. 6 is a first flow according to an embodiment of the present disclosure.

FIG. 6 is a first flow according to an embodiment of the present disclosure.

Figure 7:
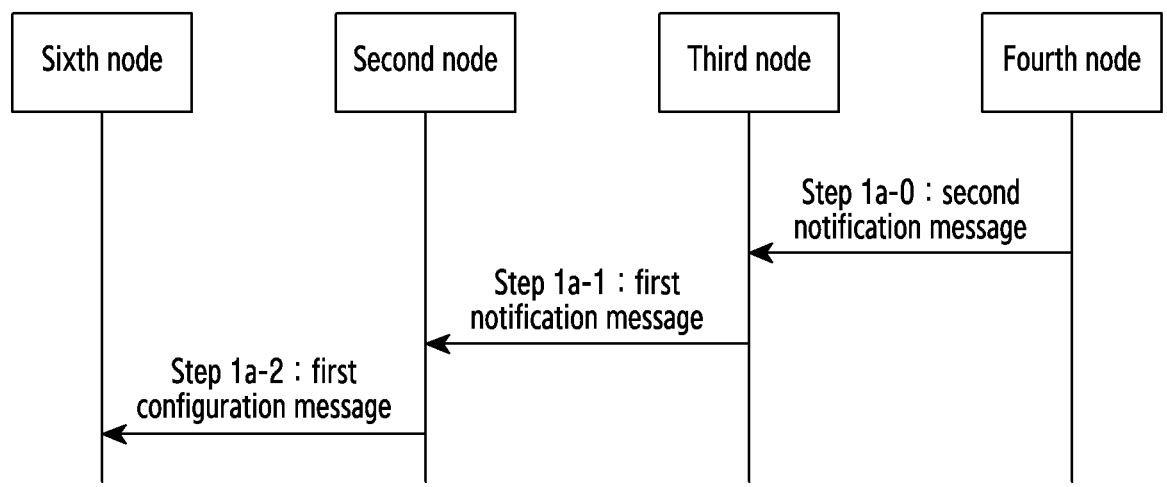
FIG. 7 is a second flow according to an embodiment of the present disclosure.

As shown in FIG. 6, in order to overcome the above-described two problems (problem 1 and problem 2), the present disclosure provides an flow below:

Step 1: sending, by a first network node to a second network node, a first message, wherein, according to functions of the message, contents contained by the message will be different:

1) When the first message is related to notifying network conditions (including, for example, a congestion condition, a link failure condition, etc.), the network conditions are all network conditions of nodes in the network controlled by the first network node, and further, the network conditions are all notified to the first network node by the nodes in the network controlled by the first network node. Although for the sake of brevity, in the present disclosure, related messages are described by mainly taking the congestion condition and relevant information as examples, but it should be understood that, a concept of the present disclosure is not limited to the congestion condition, but is equally applicable to other network conditions, including, for example, link failure, etc. Taking the congestion condition as an example, the message at least includes one of information below:

Congestion indication information, wherein, an example of the information is first congestion indication information below, and another example is third congestion indication information below Indication information of a congested node, wherein, an example of the information is first indication information of a congested node below, and another example is third indication information of a congested node below Indication information of a congested cell group, wherein, an example of the information is first indication information of a congested cell group below, and another example is third indication information of a congested cell group below Indication information of a congested cell, wherein, an example of the information is first indication information of a congested cell below, and another example is third indication information of a congested cell below Indication information of a congested route/path, wherein, an example of the information is first indication information of a congested route/path below, and another example is third indication information of a congested route/path below Indication information of a congested channel, wherein, an example of the information is first indication information of a congested channel below, and another example is third indication information of a congested channel below Indication information of a congested link, wherein, an example of the information is first indication information of a congested link below, and another example is third indication information of a congested link below FIG. 7 is a second flow according to an embodiment of the present disclosure.

Figure 8:
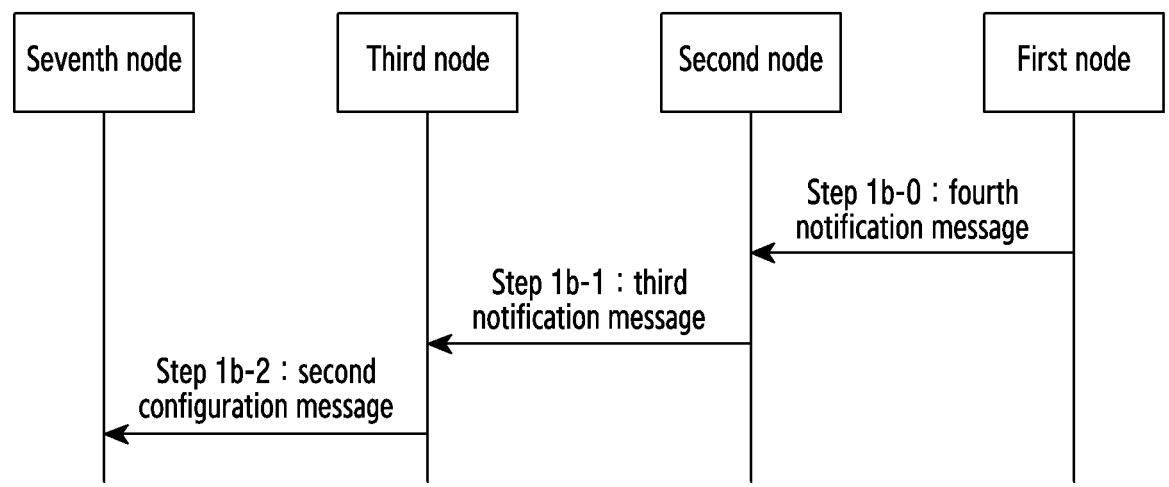
FIG. 8 is a third flow according to an embodiment of the present disclosure.

FIG. 8 is a third flow according to an embodiment of the present disclosure.

As shown in FIG. 7 and FIG. 8, the first network node and the second network node as described above may respectively be the third node and the second node in FIG. 7 below, or may also respectively be the second node and the third node in FIG. 8 below.

Figure 9:
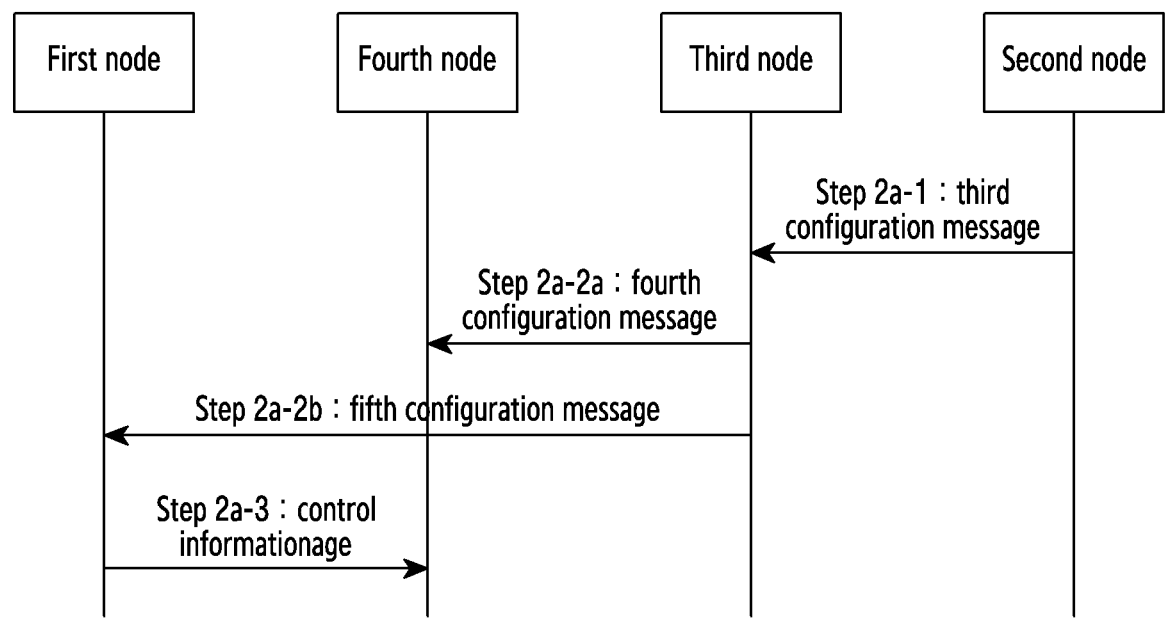
FIG. 9 is a fourth flow according to an embodiment of the present disclosure.

2) When the first message is used in configuration of the control information of the relay node, the message may help configure transmitting or receiving of the control information of the relay node, and the message at least includes one of information below:

Threshold configuration information, wherein, description in step 2a-1 below may be referred to for description of the information Report configuration indication information, wherein, description in step 2a-1 below may be referred to for description of the information Channel indication information, wherein, description in step 2b-1 below may be referred to for description of the information FIG. 9 is a fourth flow according to an embodiment of the present disclosure.

Figure 10A:
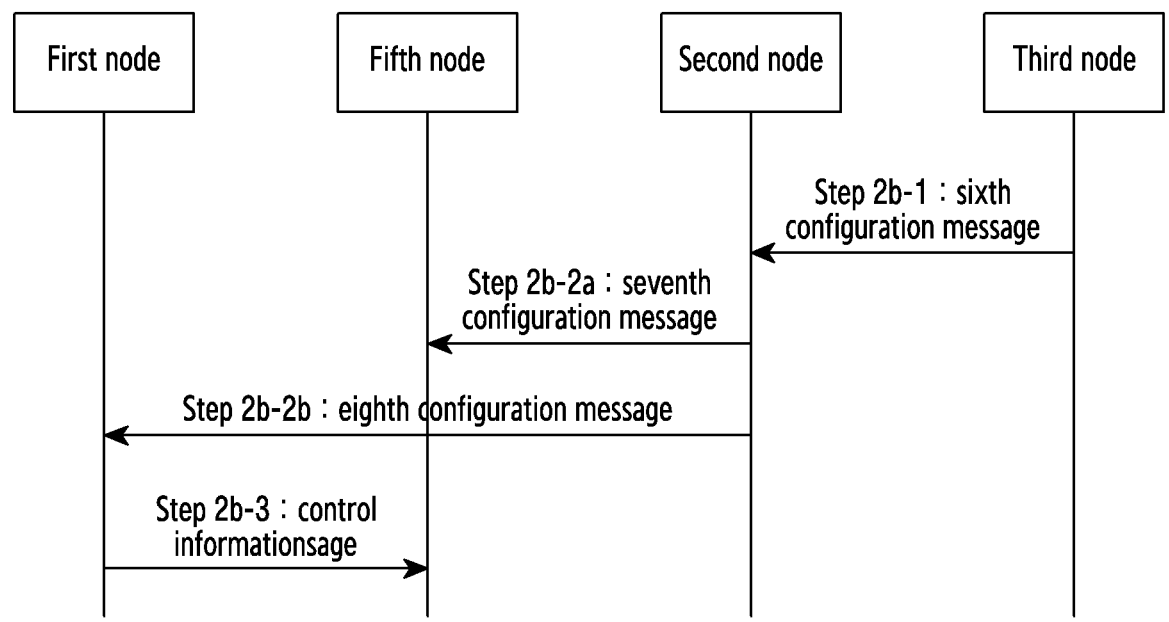
FIG. 10A is a fifth flow according to an embodiment of the present disclosure.

FIG. 10A is a fifth flow according to an embodiment of the present disclosure.

As shown in FIG. 9 and FIG. 10A, the first network node and the second network node as described above may respectively be the third node and the second node in FIG. 10A below, or may also respectively be the second node and the third node in FIG. 9 below.

Figure 10B:
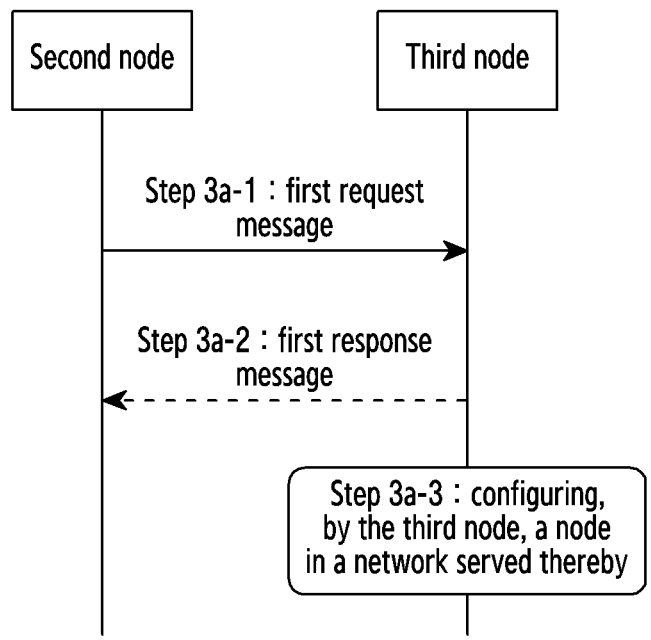
FIG. 10B is a sixth flow according to an embodiment of the present disclosure.

3) When the first message is used to request to revoke/release a traffic, the message may be used to transfer the traffic from a network (topology) back to a network (topology) to which the data originally belongs, and the message at least includes one of information below:

FIG. 10B is a sixth flow according to an embodiment of the present disclosure.

Figure 10C:
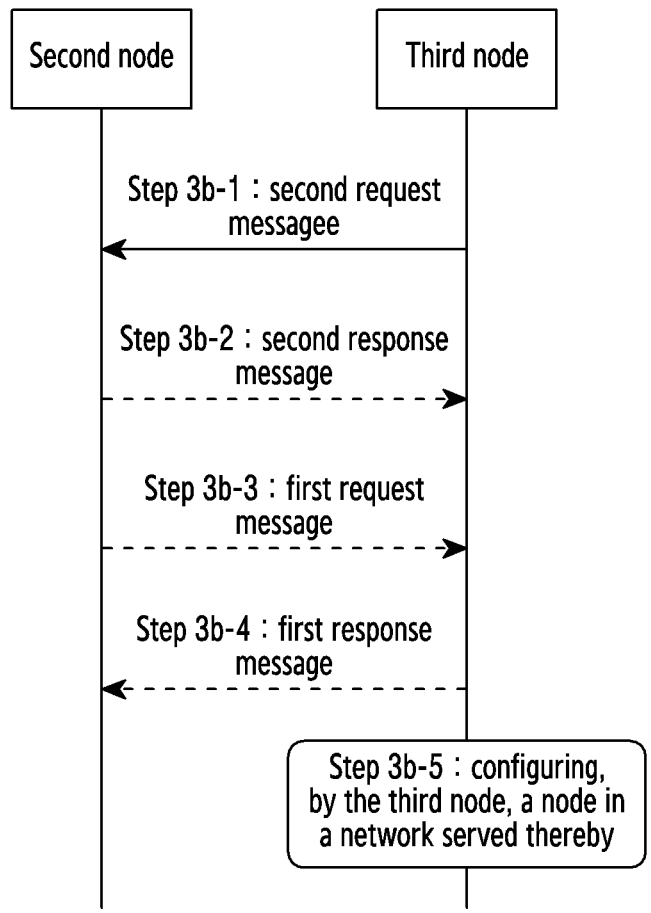
FIG. 10C is a seventh flow according to an embodiment of the present disclosure.

FIG. 10C is a seventh flow according to an embodiment of the present disclosure.

As shown in FIG. 10B and FIG. 10C, traffic information, wherein, description of "first traffic information" in step 3a-1 of FIG. 10B below or description of "second traffic information" in step 3b-1 of FIG. 10C below may be referred to for description of the information Configuration information of data, wherein, description of "second configuration information of data" in step 3a-1 of FIG. 10B or description of "fifth configuration information of data" in step 3b-1 of FIG. 10C may be referred to for description of the information Step 2: Optionally, sending, by the second network node to a third network node, a second message, wherein, according to functions of the message, contents contained by the message will be different:

1) When the second message is related to configuration of data transmission, in an embodiment, after learning congestion of the network, the second network node will configure data transmission of the third network node, so as to avoid occurrence of congestion; and the message at least includes one of information below:

Indication information of data, wherein, step 1a-2 below may be referred to for description of the information Congestion notification information, wherein, step 1a-2 below may be referred to for description of the information Configuration information of data transmission, wherein, step 1a-2 below may be referred to for description of the information The above-described third network node may be a user plane portion of a central unit of a base station; in an embodiment, the second network node and the third network node may respectively be the second node and the sixth node in FIG. 7 below; or, the above-described third network node may be a distributed unit of a base station; in an embodiment, the second network node and the third network node may respectively be the third node and the seventh node in FIG. 8 below.

2) When the second message is related to configuration of control information, the message may be used to configure transmitting and receiving of control information of the relay node, and the message at least includes one of information below:

Indication information of control information transmission, wherein, step 2b-2b below may be referred to for description of the information Report configuration indication information, wherein, step 2a-1 below may be referred to for description of the information Threshold configuration information, wherein, step 2a-1 below may be referred to for description of the information The above-described third network node may be a relay node; in an embodiment, the second network node and the third network node are respectively the second node and the fifth node in FIG. 10A below; in an embodiment, the second network node and the third network node are respectively the second node and the first node in FIG. 10A below; in an embodiment, the second network node and the third network node are respectively the third node and the fourth node in FIG. 9 below; and in an embodiment, the second network node and the third network node are respectively the third node and the first node in FIG. 9 below.

A First Aspect: Congestion Detection and Resolution

To address problem 1 (congestion condition is unknown), the present disclosure proposes two different methods:

Method I: obtaining, by a second node, a congestion condition and solving the congestion problem A flow involved in the method is shown in FIG. 7.

Step 1a-1: sending, by a third node to the second node, a first notification message, wherein, the message functions to notify a congestion condition of the network managed by the third node (e.g., congestion occurs to a fourth node), and the message at least includes one of information below:

First congestion indication information, wherein, the information indicates that congestion occurs to the network managed by the third node; in an embodiment, the network indicated by the information is a network serving data transmission of a first node and/or a child node; in an embodiment, the information indicates that congestion occurs to the parent node (e.g., the fourth node) of the first node in the network managed by the third node; and in an embodiment, the information indicates that congestion occurs to one or more nodes in the network serving data transmission of the first node and/or the child node First indication information of a congested node, wherein, the information indicates a node where congestion occurs; the indication information may be, for example, identity information of the node where congestion occurs, for example, an ID, a BAP address, etc.; and in an embodiment, the identity information indicates the parent node of the first node, for example, the fourth node First indication information of a congested cell group, wherein, the information indicates a cell group where congestion occurs; and the indication information may be, for example, an identity of the cell group, and may include, for example, an identity of a Main Cell Group MCG and an identity of a Secondary Cell Group SCG First indication information of a congested cell, wherein, the information indicates a cell where congestion occurs; and the indication information may be, for example, a cell identity First indication information of a congested route/path, wherein, the information indicates a route/path where congestion occurs; the indication information may be, for example, identity information of the route/path where congestion occurs; the route/path may be an ingress route/path, or may also be an egress route/path. The information may indicate one or more routes/paths; further, the route/path indicated by the indication information is a route/path passing through a parent node (e.g., the fourth node) of the first node. In an embodiment, the identity of the route may include address information (e.g., a BAP address) and an identity of the path (a Path ID)

First indication information of a congested channel, wherein, the information indicates a channel where congestion occurs; the indication information may be, for example, identity information of the channel where congestion occurs (e.g., a backhaul link channel); the information may indicate one or more channels; in an embodiment, the channel is a channel between the first node and the fourth node. Further, with respect to one channel, the information may further include identity information (e.g., an ID, a BAP address, etc.) of a node serving the channel; in an embodiment, the node is a child node serving the channel; in another embodiment, the node is a parent node serving the channel. In one example, the channel indicated by the information is a channel between the first node and a parent node thereof (e.g., the fourth node). Further, the channel may be an ingress channel (i.e., a channel used by the relay node to receive data), or may also be an egress channel (i.e., the channel used by the relay node to transmit data)

First indication information of a congested link, wherein, the information indicates a link where congestion occurs (the link is a communication link between two directly connected nodes); in an embodiment, the link may be represented by an identity of a child node serving the link, then the indication information may be the identity (e.g., an ID, a BAP address) of the child node serving the link where congestion occurs; in another embodiment, the link may be represented by an identity of a parent node serving the link, then the indication information may be the identity (e.g., an ID, a BAP address) of the parent node serving the link where congestion occurs. In one example, the link indicated by the information is a link between the first node and a parent node thereof (e.g., the fourth node)

The above-described first notification message may be an existing Xn/X2 interface message, for example, a secondary node addition/modification request message, a secondary node modification required message, or may also be a newly defined message, for example, an IAB Transport Migration Management Request message, an IAB Transport Migration Management Required message, an IAB Transport Migration Request message, an IAB Transport Migration Required message, and an IAB Migration Revocation message. A type of the above-described first notification message is not limited thereto.

After receiving the above-described first notification message, the second node may reconfigure data transmission (e.g., reduce data transmitted through the network controlled by the third node, configure other cells for the first node, add new serving cells for the first node, etc.).

When the second node is a control plane portion of a central unit of a base station, in order to solve the congestion problem, the method may further include steps of:

Step 1a-2: sending, by the second node to a sixth node (a user plane portion of the central unit of the base station) a first configuration message, wherein, the message functions to configure data transmission of the sixth node, and the message at least includes one of information below:

Indication information of data, wherein, the information indicates a type of data; in an embodiment, the information may be used to indicate data suffering congestion; in another embodiment, the information may be used to indicate data that needs to be subjected to congestion control (i.e., the data that needs to have a method adopted to avoid congestion); and the information at least includes one of information below:

Indication information of a bearer, wherein, the information indicates one or more bearers; with respect to a bearer, the information includes identity information of the bearer, for example, a DRB ID Indication information of a tunnel, wherein, the information indicates one or more tunnels; with respect to a tunnel, the information includes a transmission layer address and/or a tunnel endpoint identity Indication information of an address, wherein, the information indicates one or more addresses; with respect to an address, the information may be an IP address, a BAP address, a MAC address, etc.

Indication information of a header, wherein, the information indicates a value of one or more fields contained in the header; the information may be a Differentiated Services Code Point (DSCP), a flow label, a BAP routing identity (a BAP routing ID)

Indication information of a route/path, wherein, the information indicates one or more routes/paths; with respect to a route/path, the information includes a route/path identity Indication information of a channel, wherein, the information indicates one or more channels; with respect to a channel, the information includes a channel identity Congestion notification information, wherein, the information indicates that congestion occurs in data transmission; in an embodiment, the information indicates that congestion occurs in the network transmitting data; and in another embodiment, the information indicates that congestion occurs to transmission of data indicated by the above-described "indication information of data"

Configuration information of data transmission, wherein, the information indicates controlling configuration of data transmission, for example, indicates to slow down data transmission, indicates to reduce a percentage of a transmission rate, indicates to stop data transmission, etc.; in an embodiment, configuration of data transmission indicated by the information is directed to data indicated by the above-described "indication information of data"

The above-described first configuration message may be an existing E1 interface message, for example, a bearer context setup/modification request message, or may also be a new E1 interface message. A type of the above-described first configuration message is not limited thereto.

Before step 1a-1, optionally, the method further includes step 1a-0: sending, by a fourth node to the third node, a second notification message; wherein, the message functions are to notify the congestion condition of the fourth node to the third node, and the message at least includes one of information below:

Second indication information of a congested link, wherein, the information indicates that congestion occurs to a link between the fourth node and a node indicated by the information; and the indication information may be identity of a node, for example, an ID, a BAP address, etc.

Second indication information of a congested cell group, wherein, the description of "first indication information of a congested cell group" in the above-described step 1a-1 may be referred to Second indication information of a congested cell, wherein, the description of "first indication information of a congested cell" in the above-described step 1a-1 may be referred to Second indication information of a congested route/path, wherein, the information indicates a route/path where congestion occurs; the indication information may be, for example, identity information of the route/path where congestion occurs; the route/path may be an ingress route/path, or may also be an egress route/path. The information may indicate one or more routes/paths; further, the route/path indicated by the indication information is a route/path passing through the fourth node. In an embodiment, the identity of the route may include address information (e.g., a BAP address) and an identity of the path (a Path ID)

Second indication information of a congested channel, wherein, the information indicates a channel where congestion occurs; the indication information may be, for example, identity information of the channel where congestion occurs (e.g., a backhaul link channel); the information may indicate one or more channels; in an embodiment, the channel is a channel between the first node and the fourth node. Further, with respect to one channel, the information may further include identity information (e.g., an ID, a BAP address, etc.) of a node serving the channel; in an embodiment, the node is a child node serving the channel; in another embodiment, the node is a parent node serving the channel. In one example, the channel indicated by the information is a channel between the first node and a parent node thereof (e.g., the fourth node). Further, the channel may be an ingress channel (i.e., a channel used by the relay node to receive data), or may also be an egress channel (i.e., a channel used by the relay node to transmit data)

After receiving the above-described second notification message, the third node will generate content in the first notification message and send it to the second node, so that the second node solves the congestion problem.

The above-described second notification message may be an existing F1 interface message, for example, a gNB-DU status indication message, or may also be a newly defined F1 interface message. A type of the above-described second notification message is not limited thereto.

In one example, the congestion problem solved by the above-described method is congestion of a node (e.g., the fourth node) in the network controlled by the third node, but a root cause of congestion is that the node transmits the data of the second node.

In one example, the above-described third node is a node that sets up an RRC connection with the first node, for example, a donor node or a central unit of a donor node or a control plane portion of a central unit of a donor node terminated by a non-F1 interface (a non-F1-terminating donor/donor-CU/donor-CU-CP); the above-described second node is a node that sets up an F1 interface with the first node, for example, a donor node or a central unit of a donor node or a control plane portion of a central unit of a donor node terminated by an F1 interface (an F1-terminating donor/donor-CU/donor-CU-CP).

Technical effects of the method are that: the donor node (e.g., the second node) may learn that congestion occurs to the network (e.g., the fourth node) transmitting the data of the relay node (e.g., the first node), and the network transmitting the data of the relay node is a network controlled by another node (e.g., the third node) different from the donor node. After learning the congestion information, the donor node may take a solution to solve congestion, so as to ensure normal transmission of data of the relay node and a child node thereof.

Method 2: obtaining, by a third node, a congestion condition and solving the congestion problem A flow involved in the method is shown in FIG. 8.

Step 1b-1: sending, by a second node to the third node, a third notification message, wherein, the message functions are to notify the congestion condition of the network managed by the second node (e.g., a congestion occurs to a first node), and the message at least includes one of information below:

Third congestion indication information, wherein, the information indicates that congestion occurs in the network managed by the second node; in an embodiment, the network indicated by the information is a network that serves data transmission of the first node and/or a child node thereof; and in an embodiment, the information indicates that congestion occurs to the first node or the child node thereof Third indication information of a congested node, wherein, the information indicates a node where congestion occurs, and the indication information may be, for example, identity information of the node where congestion occurs, for example, an ID, a BAP address, etc.; and in an embodiment, the identity information indicates the first node or a child node thereof Third indication information of a congested cell group, wherein, the information indicates a cell group where congestion occurs; and the indication information may be, for example, an identity of a cell group, and may include, for example, an identity of a MCG and an identity of a SCG Third indication information of a congested cell, wherein, the information indicates a cell where congestion occurs, and the indication information may be, for example, a cell identity Third indication information of a congested route/path, wherein, the information indicates a route/path where congestion occurs; the indication information may be, for example, identity information of a route/path where congestion occurs; and the route/path may be an ingress route/path, or may also be an egress route/path. The information may indicate one or more routes/paths, and further, the route/path indicated by the indication information is a route/path passing through the first node or a child node thereof. In an embodiment, the identity of the route may include address information (e.g., a BAP address) and an identity of a path (a Path ID)

Third indication information of a congested channel, wherein, the information indicates a channel where congestion occurs; the indication information may be, for example, identity information of a channel (e.g., a backhaul link channel) where congestion occurs; the information may indicate one or more channels; in an embodiment, the channel is a channel between the first node and a fourth node; in an embodiment, the channel is a channel between the first node and a child node. Further, with respect to a channel, the information may further include identity information (e.g., an ID, a BAP address, etc.) of a node serving the channel; in an embodiment, the node is a child node serving the channel; in another embodiment, the node is a parent node serving the channel. In one example, the channel indicated by the information is a channel between the first node and a parent node thereof (e.g., the fourth node); and in one example, the channel indicated by the information is a channel between the first node and a child node thereof. Further, the channel may be an ingress channel (i.e., a channel used by the relay node to receive data), or may also be an egress channel (i.e., the channel used by the relay node to transmit data)

Third indication information of a congested link, wherein, the information indicates a link where congestion occurs (the link is a communication link between two directly connected nodes); in an embodiment, the link may be represented by an identity of a child node serving the link, then the indication information may be an identity (e.g., an ID, a BAP address) of a child node serving the link where congestion occurs; in another embodiment, the link may be represented by an identity of a parent node serving the link, then the indication information may be an identity (e.g., an ID, a BAP address) of a parent node serving the link where congestion occurs. In one example, the link indicated by the information is a link between the first node and a parent node thereof (e.g., the fourth node)

The above-described third notification message may be an existing Xn/X2 interface message, for example, a secondary node addition/modification request message, a secondary node modification required message, or a newly defined message. A type of the above-described third notification message is not limited thereto.

After receiving the above-described third notification message, the third node may reconfigure data transmission (e.g., configure another cell for the first node, add a new serving cell for the first node, etc.).

Step 1b-2: if the third node is a central unit of a base station or a control plane portion of the central unit of the base station, sending, by the third node to a seventh node (i.e., a distributed unit of the base station), a second configuration message for configuring data transmission of the seventh node, wherein, the message at least includes one of information below:

Indication information of data

Congestion notification information

Configuration information of data transmission

The description in step 1a-2 in FIG. 7 above may be referred to for description of the above-described information.

The above-described second configuration message may be an existing F1 interface message, for example, a UE Context Setup/Modification Request message, or a newly defined F1 interface message. A type of the above-described second configuration message is not limited thereto.

Before step 1b-1, optionally, the method further includes step 1b-0: sending, by a first node to the second node, a fourth notification message, wherein, the message functions to notify the second node of the congestion condition of the first node, and the message at least includes one of information below:

Fourth indication information of a congested link, wherein, the information indicates that congestion occurs to a link between the first node and a node indicated by the indication information, and the indication information may be, for example, an identity of a node, for example, an ID, a BAP address, etc.

Fourth indication information of a congested cell group, wherein, the information indicates a cell group where congestion occurs, and the indication information may be, for example, an identity of a cell group, and may include, for example, an identity of an MCG and an identity of an SCG Fourth indication information of a congested cell, wherein, the information indicates a cell where congestion occurs, and the indication information may be, for example, a cell identity Fourth indication information of a congested route/path, wherein, the information indicates a route/path where congestion occurs; the indication information may be, for example, identity information of the route/path where congestion occurs; and the route/path may be an ingress route/path, or may also be an egress route/path. The information may indicate one or more routes/paths, and further, the route/path indicated by the indication information is a route/path passing through the first node. In an embodiment, the identity of the route may include address information (e.g., a BAP address) and an identity of a path (a Path ID)

Fourth indication information of a congested channel, wherein, the information indicates a channel where congestion occurs; the indication information may be, for example, identity information of a channel where congestion occurs (e.g., the backhaul link channel); the information may indicate one or more channels; in an embodiment, the channel is a channel between the first node and the fourth node. Further, with respect to a channel, the information may further include identity information (e.g., an ID, a BAP address, etc.) of a node serving the channel; in an embodiment, the node is a child node serving the channel; in another embodiment, the node is a parent node serving the channel. In one example, the channel indicated by the information is a channel between the first node and a parent node thereof (e.g., the fourth node). Further, the channel may be an ingress channel (i.e., a channel used by the relay node to receive data), or may also be an egress channel (i.e., the channel used by the relay node to transmit data)

After receiving the fourth notification message, the second node will generate the content in the third notification message and send the same to the third node, so that the third node solves the congestion problem.

The above-described fourth notification message may be an existing F1 interface message, for example, a gNB-DU status indication message, or may also be a newly defined F1 interface message. A type of the above-described fourth notification message is not limited thereto.

In an example, the congestion problem solved by the above-described method is a congestion of a node (e.g., the first node) in the network controlled by the second node, but congestion is caused by the network controlled by the third node.

In an example, the above-described third node is a node that sets up an RRC connection with the first node, for example, a donor node or a central unit of the donor node or a control plane portion of the central unit of the donor node terminated by a non-F1 interface (a non-F1-terminating donor/donor-CU/donor-CU-CP); the above-described second node is a node that sets up an F1 interface with the first node, for example, a donor node or a central unit of the donor node or a control plane portion of the central unit of the donor node terminated by an F1 interface (an F1-terminating donor/donor-CU/donor-CU-CP).

Technical effects of the method are that: a base station (or a central unit of the base station or a control plane portion of the central unit of the base station) (e.g., the third node) learns that congestion occurs in a node (e.g., the first node) in a network controlled by another node (e.g., the second node), and some of the data transmitted by the network controlled by the base station is being transmitted through the congested node, so the base station (e.g., the third node) may adopt a congestion avoidance mechanism.

In the above-described two methods, the message sent by the relay node (e.g., step 1a-0, or step 1b-0) is used to indicate the congestion information at the relay node, and the information interacted between the two base stations is generated according to the congestion information reported by the relay node (e.g., step 1a-1, or step 1b-1).

A Second Aspect: Control Information Configuration

In problem 2 (configuration of control information at the node cannot be coordinated), the control information concerned is control information transmitted between two directly connected relay nodes; the control information may be information related to traffic control (e.g., an available buffer size, traffic control polling information), or information of a link condition (e.g., indication information of a link failure, indication information of a link failure recovery, indication information of link failure being recovered, etc.); and in one example, the control information may be a BAP control PDU. Configuration of the control information is completed by the donor node controlling the relay node. In the two scenarios concerned by the present disclosure, the first node will provide control information to a node in a network controlled by another base station (e.g., a third node), for example, the first node provides control information to a fourth node; and in order that the fourth node can correctly understand the control information, coordination between the two base stations is needed.

To this end, the present disclosure provides an flow below, as shown in FIG. 9:

Step 2a-1: sending, by a second node to a third node, a third configuration message, wherein, the message functions are to configure control information, and the message at least includes one of information below:

Threshold configuration information, wherein, the information indicates threshold information for judging congestion, for example, congestion threshold information; the threshold may be a threshold of a buffer size, a threshold of a data transmission amount, etc.; and the information at least includes one of information below:

Indication information of a threshold value, wherein, the information indicates the threshold value; in an embodiment, the information functions to help the relay node (e.g., the fourth node) to determine whether congestion occurs to another node (e.g., the first node), for example, if the available buffer size reported by the other node received by the relay node is smaller than the threshold value, then it may be considered that congestion occurs to the other node First granularity indication information, wherein, the information indicates a granularity of data directed to by the above-described "indication information of a threshold value"; and the information at least includes one of information below:

First route indication information, wherein, the information indicates that the above-described "indication information of a threshold value" is directed to one route Second route indication information, wherein, the information may be routing identity information, that is, the information indicates that the above-described "indication information of a threshold value" is directed to the route indicated by the "second route indication information".

First channel indication information, wherein, the information indicates that the above-described "indication information of a threshold value" is directed to one channel Second channel indication information, wherein, the information may be identity information of a channel, that is, the information indicates that the above-described "indication information of a threshold value" is directed to the channel indicated by the "second channel indication information"

First address indication information, wherein, the information indicates that the above-described "indication information of a threshold value" is directed to one address Second address indication information, wherein, the information may be address information, for example, an IP address, a BAP address, that is, the information indicates that the above-described "indication information of a threshold value" is directed to the address indicated by the "second address indication information"

First indication information of an applicable node, wherein, the information indicates a node to which the above-described "indication information of a threshold value" and/or "first granularity indication information" is applicable; the information may be identity information of a node, for example, an ID, a BAP address; and after receiving the information, the third node will configure the above-described "indication information of a threshold value" and/or "first granularity indication information" to the node indicated by the information (e.g., the first node)

Report configuration indication information, wherein, the information indicates report configuration used by the relay node (e.g., the first node) when reporting control information; and the information at least includes one of information below:

Second granularity indication information, wherein, the information indicates a granularity for the relay node to report control information (e.g., available buffer size information); and the granularity indicated by the information may be one or more of granularities below:

Indication information for reporting by a channel granularity, wherein, the indication information indicates that when the relay node reports control information (e.g., an available buffer size), each piece of reported control information is directed to one channel; further, when reporting the control information, the relay node will indicate an identity of the channel to which the information is directed Indication information for reporting by a route granularity, wherein, the indication information indicates that when the relay node reports control information (e.g., available buffer size), each piece of reported control information is directed to one route; further, when reporting the control information, the relay node will indicate an identity of the route to which the information is directed Indication information for reporting by an address granularity, wherein, the indication information indicates that when the relay node reports control information (e.g., available buffer size), each piece of reported control information is directed to one address; further, when reporting the control information, the relay node will indicate an address to which the information is directed, for example, an IP address, a BAP address Second indication information of an applicable node, wherein, the information indicates a node to which the above-described "second granularity indication information" is applicable; the information may be an identity information of a node, for example, an ID, a BAP address; after receiving the information, the third node will configure the above-described "second granularity indication information" to a node indicated by the information (e.g., the first node)

The above-described third configuration message may be an existing Xn/X2 interface message, for example, a secondary node addition/modification request message, a secondary node modification required message, or may also be a newly defined message. A type of the above-described third configuration message is not limited thereto.

Step 2a-2a: sending, by the third node to a fourth node, a fourth configuration message; the message functions to provide the fourth node with relevant configuration information for receiving control information reported by another node (e.g., the first node); and the information at least includes one of information below:

Threshold Configuration Information

Step 2a-1 may be referred to for specific description of the above-described information; and content of the above-described information is generated according to the information in step 2a-1.

The above-described fourth configuration message may be an existing F1 interface message, for example, a gNB-DU Configuration Update Acknowledge message, or may also be an existing RRC message, for example, an RRCReconfiguration message, or may also be a newly defined F1 interface message or an RRC message. A type of the above-described fourth configuration message is not limited thereto.

Through the above-described step 2a-1 and step 2a-2a, the fourth node may be configured with threshold information for judging whether the first node is congested. In an actual system, the threshold information is determined by the second node because the first node is controlled by the second node. As an implementation, in the above-described scenario I, the first node will report control information (e.g., available buffer size) respectively to the fourth node and the fifth node, and the reported control information may reflect a congestion condition of the first node, so, after the fourth node and the fifth node receive the control information reported by the first node, a criteria for judging whether the first node is congested should be the same. In other words, the fourth node and the fifth node should be respectively configured with a same threshold value; one of technical effects of the above-described steps is that different relay nodes may be configured with a same threshold information, so that when a same relay node reports congestion information to these relay nodes, these relay nodes make same judgment on congestion. As another implementation, in the above-described scenario II, the second node may configure the third node with a judgment criterion thereof on congestion with respect to the first node, and help the third node to configure the fourth node controlled thereby, so as to help the fourth node to determine a congestion condition of the first node; in other words, another technical effect of the above-described steps is to help the donor node (e.g., the third node) to configure the relay node (e.g., the fourth node) controlled thereby, so that the relay node may well determine whether congestion occurs to a relay node (e.g., the first node) belonging to another donor node (e.g., the second node). In addition, through interactions in the above-described steps, still another technical effect is that, two different donor nodes may interact information for judging congestion of relay nodes in their respective networks, so that each donor node may generate a reasonable configuration and increase accuracy of congestion judgment.

Steps 2a-2b: sending, by the third node to the first node, a fifth configuration message, wherein, the message functions to provide the first node with configuration information required for reporting control information, and the information at least includes one of information below:

Report Configuration Indication Information

The above-described step 2a-1 may be referred to for specific description of the above-described information; and content of the above-described information is generated according to the information in step 2a-1. With respect to the above-described scenario I, the above-described fifth configuration message may be directly sent by the third node to the first node, for example, sent to the first node through an RRC message (RRCReconfiguration) of a SRB3, or may also be firstly sent as a container (a container directed to an SCG, for example, CG-Config) to the second node, and then sent by the second node to the first node.

The above-described fifth configuration message may be an existing F1 interface message, for example, a gNB-DU Configuration Update Acknowledge message, or may also be an existing RRC message, for example, an RRCReconfiguration message, or may also be a new F1 interface message or a new RRC message. A type of the above-described fifth configuration message is not limited thereto.

Through the above-described step 2a-1 and step 2a-2b, in an example, with respect to the above-described scenario I, when reporting control information to the fourth node and the fifth node, the first node may use same granularity for reporting. Therefore, one of the technical effects achieved by the steps is that the relay node may use same granularity to report control information to different parent nodes thereof, so as to avoid a case where one relay node maintains different buffers with respect to different granularities, and further avoid processing complexity of the relay node (e.g., the first node).

In addition, when the first node reports the control information to the fourth node, the method further includes steps of:

Step 2a-3: reporting, by the first node to the fourth node, control information. In an embodiment, the reported control information may be available buffer size, and further, other information corresponding to the control information may also be reported, for example, identity information of a backhaul link channel (a backhaul link channel ID, then available buffer size indicated by the reported control information is available buffer size of data on the channel corresponding to the identity information of the channel), identity information of a route (a BAP routing ID, then, an available buffer size indicated by the reported control information is available buffer size of the data on the route corresponding to the identity information of the route). In addition, because the fourth node and the first node are respectively controlled by the third node and the second node, when the first node sends data to a child node thereof, it needs to send data according to routing identity information (referred to first routing identity information) assigned by the second node (the data packet sent by the first node to the child node thereof will contain the first routing identity information assigned by the second node), so when the first node calculates the available buffer size, the data considered is data packets containing the first routing identity information. Some of these data packets containing the first routing identity information are sent from the fourth node to the first node; when the fourth node sends data to the first node, the routing identity information contained in the data is routing identity information assigned by the third node (referred to as second routing identity information). In other words, at the first node, it will receive, from the fourth node, data containing the second routing identity information, and then replace the second routing identity information contained in the data with the first routing identity information, which is sent by the first node to the child node thereof. In order to report a buffer status of the first node to the fourth node, the first node may have behaviors below: the first node determines available buffer size at the first node of the data corresponding to the routing identity information according to all the data packets containing the first routing identity information in a buffer thereof (a part of the data packets may come from the fifth node, and the other part comes from the fourth node, wherein, the first node will replace the routing identity information in the part of data packets from the fourth node, that is, replace the second routing identity information with the first routing identity information), and report the available buffer size to the fourth node; when reporting, the first node may also report the second routing identity information, so that the fourth node may determine the available buffer size at the first node of the data packets corresponding to the second routing identity information according to the information.

A possible situation indicated by the above-described steps is that: the routing identity information with respect to which the first node calculates the available buffer size is the first routing identity information assigned by the second node, but the routing identity information used by the first node when reporting the available buffer size is the second routing identity information assigned by the third node.

In addition to configurations of the threshold and the report granularity, in order to report the control information, the relay node also needs to configure the reporting channel. For example, when the first node reports control information to the fourth node, a channel for reporting may be configured, and such configuration is determined by the third node because the channel is controlled by the third node. However, signaling for configuring the channel is configured by the second node, so the second node needs to know the configuration; to achieve this purpose, the present disclosure provides another flow, as shown in FIG. 10A:

Step 2b-1: sending, by a third node to a second node, a sixth configuration message, wherein, the message functions to provide the second node with configuration information related to the control information, and the message at least includes one of information below:

Channel indication information, wherein, the information functions to indicate a channel used by the relay node (e.g., a first node) to transmit control information; the control information may be congestion information, or polling information, or link status information (e.g., indication information of a link failure, indication information of a link failure recovery, indication information of a link failure being recovered, etc.); in an embodiment, the control information may be BAP control information (e.g., the control information is contained in a BAP header of a data packet sent by the relay node); and the data packet containing the control information may be referred to as a BAP Control PDU. The "channel indication information" may be identity information of a channel, for example, an ID; further, the information may be identity information of a backhaul RLC channel (a Backhaul RLC channel ID), and identity information of an egress backhaul RLC channel (an Egress Backhaul RLC Channel ID). Further, the indication information may also contain identity information or address information of a next-hop node receiving the control information, for example, a next-hop node identity (a next-hop node ID), a next-hop node BAP address, etc. In addition, the indication information may be list information, that is, containing identity or address information of a group of channels and/or a group of next-hop nodes; in an example, the information may be named as a BAP Control Protocol Data Unit Channel List (a BAP Control PDU Channel List). Further, the indication information may further include indication information of a usage, wherein, the information indicates a usage of the channel, for example, used for transmitting control information (e.g., a BAP Control PDU).

Threshold configuration information, wherein, the above-described step 2a-1 may be referred to for description of the information, and content of the information is generated by the third node Report configuration indication information, wherein, the above-described step 2a-1 may be referred to for description of the information, and content of the information is generated by the third node The sixth configuration message contains "threshold configuration information" and "report configuration indication information", which may provide the second node with relevant configuration information of the third node, facilitating the second node to generate corresponding configuration, so that different donor nodes may adopt a matching configuration when configuring a respective node controlled thereby, so as to have the same or similar control over a network condition (e.g., a congestion condition).

The above-described sixth configuration message may be an existing Xn/X2 interface message, for example, a secondary node addition/modification request message, a secondary node modification required message, or may also be a newly defined message, for example, an IAB Transport Migration Management Request/Response message, an IAB Transport Migration Management Required/Confirm message, an IAB Transport Migration Request/Response message, an IAB Transport Migration Required/Confirm message, and an IAB Migration Revocation message. A type of the above-described sixth configuration message is not limited thereto.

Optionally, step 2b-2a: sending, by the second node to a fifth node, a seventh configuration message, wherein, the message functions to provide the fifth node with relevant configuration information for receiving control information reported by another node (e.g., the first node); and the information at least includes one of information below:

Threshold Configuration Information

The above-described step 2a-1 may be referred to for specific description of the above-described information; and content of the above-described information is generated according to the information in step 2b-1.

The above-described seventh configuration message may be an existing F1 interface message, for example, a gNB-DU Configuration Update Acknowledge message, or may also be an existing RRC message, for example, an RRCReconfiguration message, or may also be a new F1 interface message or a new RRC message.

A technical effect that may be achieved by the above-described step 2b-1 and step 2b-2a is that: the relay node (e.g., the first node) may report control information to different parent nodes thereof (e.g., the fourth node and the fifth node) with same granularity, to avoid a case where a relay node maintains different buffers with respect to different granularities, and further avoid processing complexity of the relay node; another technical effect is that: the relay node (e.g., the first node) may be configured to report control information to different parent nodes (e.g., nodes in the network controlled by different donor nodes, e.g., the fourth node and the fifth node), to further help different parent nodes to control the relay node.

Optionally, a step 2b-2b: sending, by the second node to the first node, an eighth configuration message, wherein, the message functions to configure transmission of control information of the relay node (e.g., the first node); and the message at least includes one of information below:

Indication information of control information transmission, wherein, the information indicates configuration for transmitting control information; in an example, the control information is a BAP control PDU, and the information at least includes one of information below:

Indication information of a type of control information, wherein, the information indicates different types of control information, and a possible type thereof is one of types below:
  A BAP layer control information, for example, a BAP control PDU.
  A User associated F1 signaling.
  A Non-user associated F1 signaling.
  A Non-F1 message.

Channel indication information, wherein, the information indicates the channel used to transmit control information (the indication information may be, for example, an ID of the channel, a backhaul link channel ID).

Topology indication information (Topology indication), wherein, the information indicates a topology to which the above-described "channel indication information" belongs, and the information at least includes one of information below:
  Identity information of a topology, for example, a topology ID.
  Indication information of a cell group, wherein, in an embodiment, the information indicates a cell group; the indication information may be, for example, an ID of the cell group; in another embodiment, the information indicates an MCG; and in another embodiment, the information indicates an SCG.
  A topology information indication, for example, an indication of a topology terminated by an F1 interface (F1-terminating topology Indication) (in one example, the topology indicated by the topology indication is a topology managed by the second node; and the second node is a donor node having an F1 interface with the first node and/or the child node of the first node), an indication of a topology terminated by a non-F1 interface (non-F1-terminating topology indication) (in one example, the topology indicated by the topology indication is a topology managed by the third node, and the third node is a donor node with no F1 interface (only an RRC connection) with the first node and/or the child node of the first node).

Report configuration indication information, the above-described step 2a-1 may be referred to for description of the information; and content of the information may be configured according to the information received in step 2b-1.

The above-described eighth configuration message may be an existing F1 interface message, for example, a gNB-DU Configuration Update Acknowledge message, or may also be an existing RRC message, for example, an RRCReconfiguration message, or may also be a newly defined F1 interface message or RRC message. A type of the above-described eighth configuration message is not limited thereto.

In an example, the above-described third node is a node that sets up an RRC connection with the first node, for example, a donor node or a central unit of a donor node or a control plane portion of a central unit of a donor node terminated by a non-F1 interface (a non-F1-terminating donor/donor-CU/donor-CU-CP); the above-described second node is a node that sets up an F1 interface with the first node, for example, a donor node or a central unit of a donor node or a control plane portion of a central unit of a donor node terminated by an F1 interface (an F1-terminating donor/donor-CU/donor-CU-CP).

Further, optionally, before the step 2b-1, the method may further include:

Step 2b-0: sending, by the second node to the third node, a sixth configuration request message, wherein, the message functions are to request the third node to provide configuration information related to control information, and the message at least includes one of information below:

First capability information, wherein, the information indicates whether the first node supports transmission of control information (e.g., a BAP Control PDU), if yes, then the third node will provide configuration information for transmitting the BAP control PDU in step 2b-1.

First request indication information, wherein, the information indicates a type of control information to which the requested configuration information is directed, for example, a BAP control PDU. If the type indicated by the information is the BAP control PDU, then the third node will provide configuration information for transmitting BAP control PDU in step 2b-1.

The above-described sixth configuration request message may be an existing Xn/X2 interface message, for example, a secondary node addition/modification request message, a secondary node modification required message, or may also be a newly defined message, for example, an IAB Transport Migration Management IAB Transport Migration Management Request/Response message, an Required/Confirm message, an IAB Transport Migration Request/Response message, an IAB Transport Migration Required/Confirm message, and an IAB Migration Revocation message. A type of the above-described sixth configuration request message is not limited thereto.

The above-described step 2b-1, step 2b-2b and the optional step 2b-0 can achieve one of technical effects below:

Configuring a channel for the relay node (e.g., the first node) to report control information, so as to effectively use radio interface resources to transmit control information Different relay nodes are configured with same threshold information, so that when a same relay node (e.g., the first node) reports control information (e.g., an available buffer size) to these relay nodes (e.g., the fourth node and the fifth node), these relay nodes make same judgment on a network condition (e.g., congestion).

The donor node (e.g., the third node) is assisted to configure a relay node (e.g., the fourth node) controlled thereby, so that the relay node can well judge whether a network condition abnormality (e.g., a congestion) occurs to another relay node (e.g., the first node).

Two different donor nodes may interact control information for judging network conditions (e.g., a congestion) of the relay nodes in the networks they control respectively, so that the respective donor nodes generate a reasonable configuration to increase accuracy of judgment.

In addition, when the first node reports control information to the fifth node, the method further includes steps of:

Step 2b-3: reporting, by the first node to the fifth node, control information, wherein, in an embodiment, the reported control information may be an available buffer size, and further, other information corresponding to the control information may also be reported, for example, identity information of a route (a BAP routing ID, then the available buffer size indicated by the reported control information is an available buffer size of the data on the route corresponding to the identity information of the route), identity information of a backhaul link channel (a Backhaul link channel ID, then the available buffer size indicated by the reported control information is an available buffer size of the data on the channel corresponding to the identity information of the channel).

A Third Aspect: Revocation of Traffics.

To solve problem 3, the present disclosure proposes two different methods:

Method I: revoking/revocation of traffics initiated by a second node.

As shown in FIG. 10B, the method includes a flow below:

Step 3a-1: sending, by the second node to a third node, a first request message, wherein, the message functions to request to transfer some traffics in the network (topology) served by the third node back into the network (topology) served by the second node; these traffics are data served by the first node and/or a child node of the first node; and further, these traffics are transmitted through the first node. With respect to one traffic of these traffics, the message at least includes one of information below:

First traffic information, wherein, in an embodiment, the information indicates data that needs to be revoked; in another embodiment, the information indicates data that needs to be released (e.g., data that needs to be released in the topology served by the third node). With respect to one traffic, the information at least includes one of information below:

Identity information of the traffic, for example, identity information of the traffic (a traffic ID), index information of the traffic (a traffic index)

First reason information, wherein, the information indicates a reason for requesting data revocation, for example, a congestion, a link failure, etc.

First configuration information of data, wherein, the information indicates a configuration of revoked data or released data; in an embodiment, the configuration information may be (backhaul link) information in a topology terminated by a non-F1 interface (Non-F1-terminating Topology BH Information). The revoked traffic may contain one or more kinds of data; and with respect to one kind of data, the information at least includes one of information below for describing configuration of data:

Indication information of data information, for example, an identity of data, an index of data, and an index of backhaul link information of data (a backhaul information index); in an embodiment, the information may be used to represent one or more pieces of configuration information used when data is transmitted in the network (topology) controlled by the third node (e.g., other configurations directed to the data indicated by the indication information that are contained in the above-described "configuration information of data"); and according to the information, the third node may learn revoked or released data. In addition, before the step 3a-1, when the third node serves the data, the indication information is also used to index the configuration information (e.g., routing identity information, channel information, next-hop or prior-hop node information, etc.) used by the third node when serving the data that is supplied by the third node to the second node.

Routing identity information, for example, a routing ID, a BAP routing ID, wherein, the information indicates a route used when transmitting data (e.g., when transmitting data in the network (topology) served by the third node). In an embodiment, the information contains a (BAP) address and a path identity (a path ID); in one example, the information may be an ingress routing identity, that is, the data is downlink data sent to the first node by the network (topology) served by the third node; and in an embodiment, the information may be an egress routing identity, that is, the data is uplink data sent by the first node to the network (topology) served by the third node.

An ingress routing identity, for example, an ingress routing ID, an ingress BAP routing ID, wherein, the information includes a (BAP) address and a path identity (a path ID); the information indicates a routing identity of downlink data. The information indicates a route used when transmitting data (e.g., when transmitting data in the network (topology) served by the third node).

An egress routing identity, for example, an egress routing ID, an egress BAP routing ID, wherein, the information includes a (BAP) address and a path identity (a path ID); and the information indicates a routing identity of uplink data. The information indicates a route used when transmitting data (e.g., when transmitting data in the network (topology) served by the third node).

Channel identity information, for example, a channel ID, wherein, the information indicates a channel used when transmitting data (e.g., when transmitting data in the network (topology) served by the third node). In an embodiment, the information may be identity information of a backhaul link RLC channel (a backhaul RLC channel ID); the information indicates a channel used when transmitting data; in one example, the information may be ingress channel identity information, that is, the data transmitted by the channel identified by the information is downlink data sent by the network (topology) served by the third node to the first node; in an embodiment, the information may be egress channel identity information, that is, the data transmitted by the channel identified by the information is uplink data sent by the first node to the network (topology) served by the third node; in an embodiment, the channel indicated by the information is not only used for transmitting uplink data (uplink data sent by the first node to the network served by the third node), but also used for transmitting downlink data (downlink data sent by the network served by the third node to the first node); in the embodiment, the channel may be a channel in a topology terminated by a non-F1 interface (in this case, the channel identity information may be, for example, a channel identity in a topology terminated by a non-F1 interface (a non-F1-terminating topology channel ID)).

Ingress channel identity information, wherein, the information indicates a channel that transmits downlink data; and the information indicates a channel used when transmitting data (e.g., when transmitting data in the network (topology) served by the third node).

Egress channel identity information, wherein, the information indicates a channel that transmits uplink data; and the information indicates a channel used when transmitting data (e.g., when transmitting data in the network (topology) served by the third node).

Identity information or address information of a prior-hop node, for example, a prior-hop node identity (a prior-hop node ID), a prior-hop BAP address, wherein, the information indicates a node that sends downlink data to the first node; and further, the node may be a node in the network (topology) served by the third node.

Identity information or address information of a next-hop node, for example, a next-hop node identity (a next-hop node ID), a next-hop BAP address, wherein, the information indicates a node that receives the uplink data sent by the first node; and further, the node is a node in the network (topology) served by the third node.

Identity information or address information of a first communication node, for example, a node identity (a node ID), a BAP address, wherein, the node indicated by the information is a node that performs uplink and downlink data transmission with the first node; further, the node is a node in the network (topology) served by the third node; and in an embodiment, the information may be identity information or address information of a node in a topology terminated by a non-F1 interface (e.g., a node identity in a topology terminated by a non-F1 interface (a non-F1-terminating topology node ID), and a BAP address in a topology terminated by a non-F1 interface (a non-F1-terminating topology BAP address)).

Second configuration information of data, wherein, the information indicates a configuration of revoked data or released data; and in an embodiment, the configuration is a configuration in a topology terminated by a non-F1 interface, and the information at least includes one of information below:

Routing identity information, for example, a routing identity (a routing ID), a BAP routing identity (a BAP routing ID); wherein, in an embodiment, the information contain a (BAP) address and a path identity (a path ID); the information indicates a route used when transmitting data (e.g., when transmitting data in the network (topology) served by the third node); in one example, the information may be an ingress routing identity, that is, the data is downlink data sent by the network (topology) served by the third node to the first node; and in an embodiment, the information may be an egress routing identity, that is, the data is uplink data sent by the first node to the network (topology) served by the third node.

An ingress routing identity, for example, an ingress routing ID, an ingress BAP routing ID, wherein, the information contains a (BAP) address and a path identity (a path ID); the information indicates an routing identity of downlink data, and the information indicates a route used when transmitting data (e.g., when transmitting data in the network (topology) served by the third node).

An egress routing identity, for example, an egress routing ID, an egress BAP routing ID, wherein, the information contains a (BAP) address and a path identity (a path ID); the information indicates a routing identity of uplink data; and the information indicates a route used when transmitting data (e.g., when transmitting data in the network (topology) served by the third node).

Channel identity information, for example, a channel ID, wherein, in an embodiment, the information may be identity information of a backhaul link RLC channel (a backhaul RLC channel ID); the information indicates a channel used when transmitting data (e.g., when transmitting data in the network (topology) served by the third node); in one example, the information may be ingress channel identity information, that is, the data transmitted by the channel identified by the information is downlink data sent by the network (topology) served by the third node to the first node; in an embodiment, the information may be egress channel identity information, that is, the data transmitted by the channel identified by the information is uplink data sent by the first node to the network (topology) served by the third node; in an embodiment, the channel indicated by the information is not only used for transmitting uplink data (uplink data sent by the first node to the network served by the third node), but also used for transmitting downlink data (downlink data sent by the network served by the third node to the first node); in the embodiment, the channel may be a channel in a topology terminated by a non-F1 interface (in this case, the channel identity information may be, for example, a channel identity in a topology terminated by a non-F1 interface (a non-F1-terminating topology channel ID)).

Ingress channel identity information, wherein, the information indicates a channel that transmits downlink data; and the information indicates a channel used when transmitting data (e.g., when transmitting data in the network (topology) served by the third node).

Egress channel identity information, wherein, the information indicates a channel that transmits uplink data; and the information indicates a channel used when transmitting data (e.g., when transmitting data in the network (topology) served by the third node)

Identity information or address information of a prior-hop node, for example, a prior-hop node ID, and a prior-hop BAP address, wherein, the information indicates a node that sends downlink data to the first node; and further, the node may be a node in the network (topology) served by the third node.

Identity information or address information of a next-hop node, for example, a next-hop node ID, and a next-hop BAP address, wherein, the information indicates a node that receives uplink data sent by the first node; and further, the node is a node in the network (topology) served by the third node.

Identity information or address information of a second communication node, for example, a node ID, a BAP address, wherein, the node indicated by the information is a node that performs uplink and downlink data transmission with the first node; further, the node is a node in the network (topology) served by the third node; and in an embodiment, the information may be identity information or address information of a node in a topology terminated by a non-F1 interface (a non-F1-terminating topology node ID, a non-F1-terminating topology BAP address).

Second reason information, wherein, the information indicates a reason for requesting data revocation, for example, a congestion, a link failure, etc.

Third reason information, wherein, the information indicates a reason for requesting data revocation, for example, a congestion, a link failure, etc.

Step 3a-2: optionally, sending, by the third node to the second node, a first response message, wherein, the message functions to confirm request of the second node, and further, the message at least includes one of information below:

Indication information for accepting a traffic to be revoked (released), wherein, the information at least includes one of information below:

Identity information of a traffic.

Third configuration information of data, wherein, the information indicates data accepted to revoke by the third node, and the above-described "first configuration information of data" may be referred to for content contained in the information.

Configuration information of data accepted to be revoked (released) data, wherein, the above-described "second configuration information of data" may be referred to for content contained in the information.

Indication information for refusing a traffic to be revoked (released) traffic, wherein, the information at least includes one of information below:

Identity information of a traffic.

Third configuration information of data, wherein, the information indicates data refused to revoke by the third node, and the above-described "first configuration information of data" may be referred to for content contained in the information.

Configuration information of data refused to be revoked (released) data, wherein, the above-described "second configuration information of data" may be referred to for content contained in the information.

Step 3a-3: configuring, by the third node, a node in the network served thereby, in order to release configuration and resources required to transmit the above-described revoked (released) data.

Method II: Revoking/Revocation of Traffics Initiated by a Third Node.

As shown in FIG. 10C, the method includes flows below:

Step 3b-1: sending, by the third node to a second node, a second request message, wherein, the message functions to request to transfer some traffics in the network (topology) served by the third node back into the network (topology) served by the second node; these traffics are data served by the first node and/or the child node of the first node; and further, these traffics are transmitted through the first node. With respect to one of these traffics, the message at least includes one of information below:

Second traffic information, wherein, in an embodiment, the information indicates data that needs to be revoked (e.g., by the second node); and in another embodiment, the information indicates data that needs to be released (e.g., data that needs to be released in the topology served by the third node). With respect to a traffic, the information at least includes one of information below:

Identity information of a traffic, for example, identity information of the traffic (a traffic ID), index information of a traffic (a traffic index).

Fourth reason information, wherein, the information indicates a reason for requesting data revocation, for example, a congestion, a link failure, etc.

Fourth configuration information of data, wherein, the information indicates configuration of data to be revoked or data to be released; in an embodiment, the configuration information may be (backhaul link) information in a topology terminated by a non-F1 interface (a Non-F1-terminating Topology BH Information). The traffic to be revoked may contain one or more kinds of data; and with respect to one kind of data, the information at least includes one of information below for describing configuration of data:

Indication information of data information, for example, an identity of data, an index of data, and an index of backhaul link information of data (a backhaul information index); in an embodiment, the information may be used to represent one or more pieces of configuration information used when data is transmitted in the network (topology) controlled by the third node (e.g., other configurations for the data indicated by the indication information that are contained in the above-described "fourth configuration information of data"); and according to the information, the third node may learn data to be revoked or released. In addition, before the step 3b-1, when the third node serves the data, the indication information is also used to index the configuration information (e.g., routing identity information, channel information, next-hop or prior-hop node information, etc.) used by the third node when serving the data that is supplied by the third node to the second node.

Routing identity information, for example, a routing ID, a BAP routing ID, wherein, the information indicates a route used when transmitting data (e.g., when transmitting data in the network (topology) served by the third node). In an embodiment, the information contains a (BAP) address and a path identity (a path ID); in one example, the information may be an ingress routing identity, that is, the data is downlink data sent to the first node by the network (topology) served by the third node; and in an embodiment, the information may be an egress routing identity, that is, the data is uplink data sent by the first node to the network (topology) served by the third node.

An ingress routing identity, for example, an ingress routing ID, an ingress BAP routing ID, wherein, the information includes a (BAP) address and a path identity (a path ID); the information indicates a routing identity of downlink data. The information indicates a route used when transmitting data (e.g., when transmitting data in the network (topology) served by the third node).

An egress routing identity, for example, an egress routing ID, an egress BAP routing ID, wherein, the information includes a (BAP) address and a path identity (a path ID); and the information indicates a routing identity of uplink data. The information indicates a route used when transmitting data (e.g., when transmitting data in the network (topology) served by the third node).

Channel identity information, for example, a channel ID, wherein, the information indicates a channel used when transmitting data (e.g., when transmitting data in the network (topology) served by the third node). In an embodiment, the information may be identity information of a backhaul link RLC channel (a backhaul RLC channel ID); the information indicates a channel used when transmitting data; in one example, the information may be ingress channel identity information, that is, the data transmitted by the channel identified by the information is downlink data sent by the network (topology) served by the third node to the first node; in an embodiment, the information may be egress channel identity information, that is, the data transmitted by the channel identified by the information is uplink data sent by the first node to the network (topology) served by the third node; in an embodiment, the channel indicated by the information is not only used for transmitting uplink data (uplink data sent by the first node to the network served by the third node), but also used for transmitting downlink data (downlink data sent by the network served by the third node to the first node); in the embodiment, the channel may be a channel in a topology terminated by a non-F1 interface (in this case, the channel identity information may be, for example, a channel identity in a topology terminated by a non-F1 interface (a non-F1-terminating topology channel ID)).

Ingress channel identity information, wherein, the information indicates a channel that transmits downlink data; and the information indicates a channel used when transmitting data (e.g., when transmitting data in the network (topology) served by the third node).

Egress channel identity information, wherein, the information indicates a channel that transmits uplink data; and the information indicates a channel used when transmitting data (e.g., when transmitting data in the network (topology) served by the third node).

Identity information or address information of a prior-hop node, for example, a prior-hop node ID, and a prior-hop BAP address, wherein, the information indicates a node that sends downlink data to the first node; and further, the node may be a node in the network (topology) served by the third node.

Identity information or address information of a next-hop node, for example, a next-hop node ID, and a next-hop BAP address, wherein, the information indicates a node that receives uplink data sent by the first node; and further, the node is a node in the network (topology) served by the third node.

Identity information or address information of a first communication node, for example, a node ID, and a BAP address, wherein, the node indicated by the information is a node that performs uplink and downlink data transmission with the first node; further, the node is a node in the network (topology) served by the third node; and in an embodiment, the information may be identity information or address information of a node in a topology terminated by a non-F1 interface (a non-F1-terminating topology node ID, a non-F1-terminating topology BAP address).

Fifth configuration information of data, wherein, the information indicates configuration of data to be revoked; in an embodiment, the configuration is a configuration in a topology terminated by a non-F1 interface; and the information at least includes one of information below:

Routing identity information, for example, a routing ID, a BAP routing ID; wherein, in an embodiment, the information contains a (BAP) address and a path identity (a path ID); the information indicates a route used when transmitting data (e.g., when transmitting data in the network (topology) served by the third node); in one example, the information may be an ingress routing identity, that is, the data is downlink data sent by the network (topology) served by the third node to the first node; and in an embodiment, the information may be an egress routing identity, that is, the data is uplink data sent by the first node to the network (topology) served by the third node.

An ingress routing identity, for example, an ingress routing ID, an ingress BAP routing ID, wherein, the information contains a (BAP) address and a path identity (a path ID); the information indicates a routing identity of downlink data, and the information indicates a route used when transmitting data (e.g., when transmitting data in the network (topology) served by the third node).

An egress routing identity, for example, an egress routing ID, an egress BAP routing ID, wherein, the information contains a (BAP) address and a path identity (a path ID); the information indicates a routing identity of uplink data; and the information indicates a route used when transmitting data (e.g., when transmitting data in the network (topology) served by the third node).

Channel identity information, for example, a channel ID, wherein, in an embodiment, the information may be identity information of a backhaul link RLC channel (a backhaul RLC channel ID); the information indicates a channel used when transmitting data (e.g., when transmitting data in the network (topology) served by the third node); in one example, the information may be ingress channel identity information, that is, the data transmitted by the channel identified by the information is downlink data sent by the network (topology) served by the third node to the first node; in an embodiment, the information may be egress channel identity information, that is, the data transmitted by the channel identified by the information is uplink data sent by the first node to the network (topology) served by the third node; in an embodiment, the channel indicated by the information is not only used for transmitting uplink data (uplink data sent by the first node to the network served by the third node), but also used for transmitting downlink data (downlink data sent by the network served by the third node to the first node); in the embodiment, the channel may be a channel in a topology terminated by a non-F1 interface (in this case, the channel identity information may be, for example, a channel identity in a topology terminated by a non-F1 interface (a non-F1-terminating topology channel ID)).

Ingress channel identity information, wherein, the information indicates a channel that transmits downlink data; and the information indicates a channel used when transmitting data (e.g., when transmitting data in the network (topology) served by the third node).

Egress channel identity information, wherein, the information indicates a channel that transmits uplink data; and the information indicates a channel used when transmitting data (e.g., when transmitting data in the network (topology) served by the third node).

Identity information or address information of a prior-hop node, for example, a prior-hop node ID, a prior-hop BAP address, wherein, the information indicates a node that sends downlink data to the first node; and further, the node may be a node in the network (topology) served by the third node.

Identity information or address information of a next-hop node, for example, a next-hop node ID, a next-hop BAP address, wherein, the information indicates a node that receives uplink data sent by the first node; and further, the node is a node in the network (topology) served by the third node.

Identity information or address information of a second communication node, for example, a node ID, a BAP address, wherein, the node indicated by the information is a node that performs uplink and downlink data transmission with the first node; further, the node is a node in the network (topology) served by the third node; and in an embodiment, the information may be identity information or address information of a node in a topology terminated by a non-F1 interface (a non-F1-terminating topology node ID, a non-F1-terminating topology BAP address).

Fifth reason information, wherein, the information indicates a reason for requesting data revocation, for example, a congestion, a link failure, etc.

Sixth reason information, wherein, the information indicates a reason for requesting data revocation, for example, a congestion, a link failure, etc.

Step 3b-2: optionally, sending, by the second node to the third node, a second response message, wherein, the message functions to confirm request of the third node, and further, the message at least includes one of information below:

Indication information for accepting a traffic to be revoked (released), wherein, the information at least includes one of information below:

Identity information of a traffic.

Sixth configuration information of data, wherein, the information indicates data accepted to revoked by the second node, and the above-described "fourth configuration information of data" may be referred to for content contained in the information.

Configuration information of data accepted to be revoked (released), wherein, the above-described "fifth configuration information of data" may be referred to for content contained in the information.

Indication information for refusing a traffic to be revoked (released), wherein, the information at least includes one of information below:

Identity information of a traffic.

Sixth configuration information of data, wherein, the information indicates data refused to be revoked by the second node, and the above-described "fourth configuration information of data" may be referred to for content contained in the information.

Configuration information of data refused to be revoked (released), wherein, the above-described "fifth configuration information of data" may be referred to for content contained in the information.

Further, optionally, the method may further include steps of:

Step 3b-3: a data revocation request initiated by the second node, wherein, the step 3a-1 in FIG. 10B above may be referred to for detailed content.

Step 3b-4: optionally, confirming, by the third node, the data revocation request initiated by the second node, wherein, the step 3a-2 in FIG. 10B above may be referred to for detailed content.

Step 3b-5: configuring, by the third node, a node in the network served thereby, in order to release configuration and resources required to transmit the above-described data to be revoked (released).

The above-described steps 3b-2/3b-3/3b-4/3b-5 are not necessary steps, and an execution order may also be adjusted; in an embodiment, the above-described steps 3b-3/3b-4 may occur between the step 3b-1 and step 3b-2; in an embodiment, the above-described step 3b-2 may be omitted.

The first request message or the second request message as described above may be an existing Xn/X2 interface message, for example, a secondary node addition/modification request message, a secondary node modification required message, or may also be a newly defined message, for example, an IAB Transport Migration Management Request message, an IAB Transport Migration Management Required message, an IAB Transport Migration Request message, an IAB Transport Migration Required message, and an IAB Migration Revocation message. A type of the first request message or the second request message as described above is not limited thereto.

The first response message or the second response message as described above may be an existing Xn/X2 interface message, for example, a secondary node addition/modification response message, a secondary node modification confirm message, or may also be a newly defined message, for example, an IAB Transport Migration Management Response message, an IAB Transport Migration Management Confirm message, an IAB Transport Migration Response message, an IAB Transport Migration Confirm message, and an IAB Migration Revocation message. A type of the first response message or the second response message as described above is not limited thereto.

Advantageous effects of the above-described flows are that: a donor node serving the relay node (the first node and/or the child node of the first node) may request to revoke the traffics transmitted by a network served by other donor node, so as to avoid resource occupancy in the network served by the other donor node; or the other donor node may request to transfer the traffics served thereby back to the donor node to which these traffics originally belong, so that when a problem (e.g., a congestion, a link failure, etc.) occurs in the network served by the other donor node, the data served thereby may be transferred back to the network (topology) served by the donor node to which the data originally belongs, so as to solve the problem occurring to the network, or improve performance of data transmission (e.g., increase throughput, reduce latency, etc.).

Figure 11:
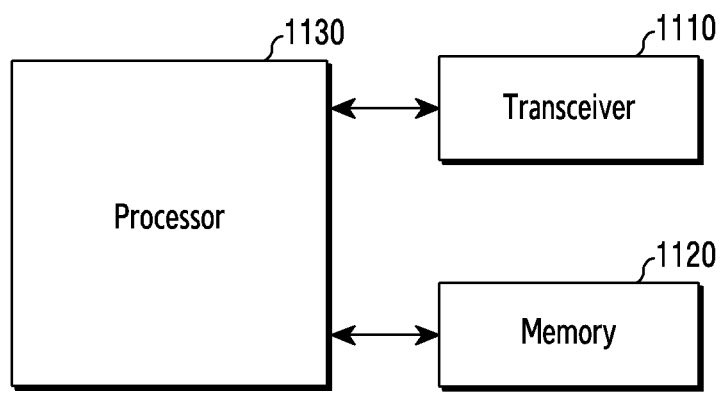
FIG. 11 is a block diagram of a node according to an embodiment of the present disclosure.

FIG. 11 is a block diagram of a node according to an embodiment of the present disclosure. Here, a node is taken as an example to illustrate a structure and a function thereof, but it should be understood that, the structure and the function shown may also be applied to a base station (or a central unit of a base station, or a control plane portion of a central unit of a base station, or a user plane portion of a central unit of a base station, or a distributed unit of a base station, etc.).

As shown in FIG. 11, the node 1100 includes a transceiver 1110, a memory 1120 and a processor 1130. Under control of the one or more processors 1130, the node 1100 (including the transceiver 1110 and the processor 1130) is configured to execute operations of the nodes in the flows shown in FIG. 6 to FIG. 10C or as described above. Although the transceiver 1110, the memory 1120, and the processor 1130 are shown as separate entities, they may be implemented as a single entity, for example, a single chip. Furthermore, the node of FIG. 11 corresponds to the base station (gNB/ng-eNB) of the FIG. 3A to 3C.

The transceiver 1110 collectively refers to a base station receiver and a base station transmitter, and may transmit/receive a signal to/from a terminal (UE 201) or a network entity. The signal transmitted or received to or from the terminal or a network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the base station. Also, the memory 1120 may store control information or data included in a signal obtained by the base station. The memory 1120 may be a storage medium, such as read-only memory (ROM), random access memory (RAM), a hard disk, a CD-ROM, and a DVD, or a combination of storage media.

The processor 1130 may control a series of processes such that the base station operates as described above. For example, the transceiver 1110 may receive a data signal including a control signal transmitted by the terminal, and the processor 1130 may determine a result of receiving the control signal and the data signal transmitted by the terminal. In this case, the processor 1130 may be configured to execute instructions (including computer programs) stored in the memory 1120 to control overall operation of the node 1100, so as to implement the operations of the nodes in the flows shown in FIG. 6 to FIG. 10C or as described above.

Figure 12:
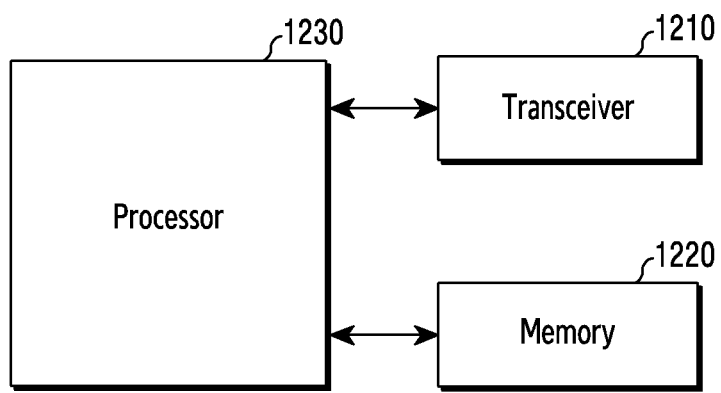
FIG. 12 is a block diagram of a network entity according to an embodiment of the present disclosure.

FIG. 12 is a block diagram of a network entity according to an embodiment of the present disclosure.

Referring to FIG. 12, the network entity includes a transceiver 1210, a memory 1220, and a processor 1230. The transceiver 1210, the memory 1220, and the processor 1230 of the network entity may operate according to a communication method of the network entity described above. However, the components of the terminal are not limited thereto. For example, the network entity may include fewer or a greater number of components than those described above. In addition, the processor 1230, the transceiver 1210, and the memory 1220 may be implemented as a single chip. Also, the processor 1230 may include at least one processor. Furthermore, the network entity of FIG. 12 corresponds to the 5GC of the FIG. 2.

The network entity includes at least one entity of a core network. For example, the network entity includes an AMF, a session management function (SMF), a policy control function (PCF), a network repository function (NRF), a user plane function (UPF), a network slicing selection function (NSSF), an authentication server function (AUSF), a UDM and a network exposure function (NEF), but the network entity is not limited thereto.

The transceiver 1210 collectively refers to a network entity receiver and a network entity transmitter, and may transmit/receive a signal to/from a base station or a UE. The signal transmitted or received to or from the base station or the UE may include control information and data. In this regard, the transceiver 1210 may include an RF transmitter for up-converting and amplifying a frequency of a transmitted signal, and an RF receiver for amplifying low-noise and down-converting a frequency of a received signal. However, this is only an example of the transceiver 1210 and components of the transceiver 1210 are not limited to the RF transmitter and the RF receiver.

The transceiver 1210 may receive and output, to the processor 1230, a signal through a wireless channel, and transmit a signal output from the processor 1230 through the wireless channel.

The memory 1220 may store a program and data required for operations of the network entity. Also, the memory 1220 may store control information or data included in a signal obtained by the network entity. The memory 1220 may be a storage medium, such as a ROM, a RAM, a hard disk, a CD-ROM, and a DVD, or a combination of storage media.

The processor 1230 may control a series of processes such that the network entity operates as described above. For example, the transceiver 1210 may receive a data signal including a control signal, and the processor 1230 may determine a result of receiving the data signal.

Figure 13:
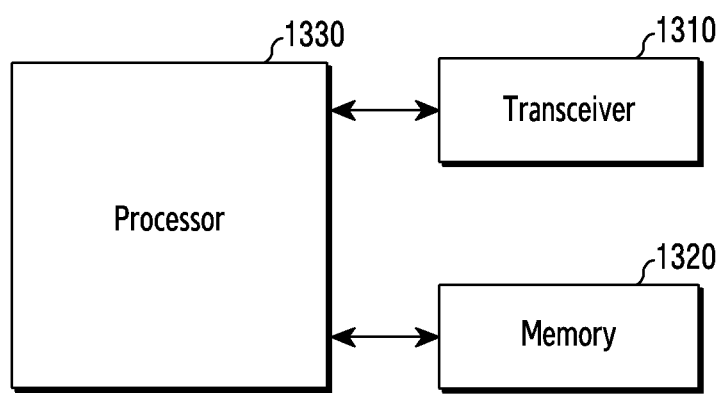
FIG. 13 is a block diagram of a UE according to an embodiment of the present disclosure.

FIG. 13 is a block diagram of a UE according to an embodiment of the present disclosure.

As shown in FIG. 13, the UE according to an embodiment may include a transceiver 1310, a memory 1320, and a processor 1330. The transceiver 1310, the memory 1320, and the processor 1330 of the UE may operate according to a communication method of the UE described above. However, the components of the UE are not limited thereto. For example, the UE may include more or fewer components than those described above. In addition, the processor 1330, the transceiver 1310, and the memory 1320 may be implemented as a single chip. Also, the processor 1330 may include at least one processor. Furthermore, the UE of FIG. 13 corresponds to the UE 201 of the FIG. 2.

The transceiver 1310 collectively refers to a UE receiver and a UE transmitter, and may transmit/receive a signal to/from a base station or a network entity. The signal transmitted or received to or from the base station or a network entity may include control information and data. The transceiver 1310 may include a RF transmitter for up-converting and amplifying a frequency of a transmitted signal, and a RF receiver for amplifying low-noise and down-converting a frequency of a received signal. However, this is only an example of the transceiver 1310 and components of the transceiver 1310 are not limited to the RF transmitter and the RF receiver.

Also, the transceiver 1310 may receive and output, to the processor 1330, a signal through a wireless channel, and transmit a signal output from the processor 1330 through the wireless channel.

The memory 1320 may store a program and data required for operations of the UE. Also, the memory 1320 may store control information or data included in a signal obtained by the UE. The memory 1320 may be a storage medium, such as read-only memory (ROM), random access memory (RAM), a hard disk, a CD-ROM, and a DVD, or a combination of storage media.

The processor 1330 may control a series of processes such that the UE operates as described above. For example, the transceiver 1310 may receive a data signal including a control signal transmitted by the base station or the network entity, and the processor 1330 may determine a result of receiving the control signal and the data signal transmitted by the base station or the network entity.

In an embodiment, a method performed by a first integrated access and backhaul (IAB) node which is a F1-terminating IAB donor node in a wireless communication system, the method comprising: receiving, from a second IAB node which is a non-F1-terminating IAB donor node, a first message including backhaul (BH) related information for at least one IAB node of a non-F1-terminating topology associated with the second IAB node; and transmitting, to a third IAB node which is an IAB node connected with the first IAB node and the second IAB node, a second message including configuration information for the third IAB node.

In an embodiment, wherein the BH related information further comprises information on an identity of a BH radio link control (RLC) channel and information on a next-hop BAP address, wherein the configuration information further comprises information indicating a type of traffic as a BAP control PDU, information on an egress BH channel for transmitting the traffic, and information indicating the non-F1-terminating topology.

In an embodiment, a method further comprising: transmitting, to the second IAB node, a request message to revoke traffics served by the second IAB node; and receiving, from the second IAB donor node, a response message for the request message, wherein the request message includes an identity of the traffics and BH information related the non-F1-terminating topology including a BH information index, wherein the response message includes an identity of traffics to be revoked and BH information related the non-F1-terminating topology to be revoked including a backhaul information index.

In an embodiment, a method further comprising: receiving, from the second IAB donor node, a request message to revoke traffics served by the IAB node; and transmitting, to the second IAB donor node, a response message for the request message, wherein the request message includes at least one of an identity of the traffics or BH information related the non-F1-terminating topology including a backhaul information index, wherein the response message includes at least one of an identity of traffics to be revoked or BH information related the non-F1-terminating topology to be revoked including a backhaul information index.

In an embodiment, a method further comprising: transmitting, to the second IAB donor node, threshold configuration information, wherein the threshold configuration information includes a threshold value of a buffer size to determine whether congestion occurs.

In an embodiment, a method performed by a second integrated access and backhaul (IAB) node which is a non-F1-terminating IAB donor node in a wireless communication system, the method comprising: transmitting, to a first IAB node which is a F1-terminating IAB donor node, a first message including backhaul (BH) related information for at least one IAB node of a non-F1-terminating topology associated with the second IAB node, wherein the first message is for transmitting the configuration information to a third IAB node which is an IAB node connected with the first IAB node and the second IAB node.

In an embodiment, wherein the BH related information further comprises information on an identity of a BH radio link control (RLC) channel and information on a next-hop BAP address, wherein the configuration information further comprises information indicating a type of traffic as a BAP control PDU, information on an egress BH channel for transmitting the traffic, and information indicating the non-F1-terminating topology.

In an embodiment, a method further comprising: receiving, from the second IAB node, a request message to revoke traffics served by the second IAB node; and transmitting, to the second IAB donor node, a response message for the request message, wherein the request message includes an identity of the traffics and BH information related the non-F1-terminating topology including a BH information index, wherein the response message includes an identity of traffics to be revoked and BH information related the non-F1-terminating topology to be revoked including a backhaul information index.

In an embodiment, a method further comprising: transmitting, to the second IAB donor node, a request message to revoke traffics served by the IAB node; and receiving, the second IAB donor node, a response message for the request message, wherein the request message includes at least one of an identity of the traffics or BH information related the non-F1-terminating topology including a backhaul information index, wherein the response message includes at least one of an identity of traffics to be revoked or BH information related the non-F1-terminating topology to be revoked including a backhaul information index.

In an embodiment, a method further comprising: receiving, from the second IAB donor node, threshold configuration information, wherein the threshold configuration information includes a threshold value of a buffer size to determine whether congestion occurs.

In an embodiment, a first integrated access and backhaul (IAB) node which is a F1-terminating IAB donor node in wireless communication, the first IAB node comprising: a transceiver; and at least one processor coupled with the transceiver and configured to: receive, from a second IAB node which is a non-F1-terminating IAB donor node, a first message including backhaul (BH) related information for at least one IAB node of a non-F1-terminating topology associated with the second IAB node; and transmit, to a third IAB node which is an IAB node connected with the first IAB node and the second IAB node, a second message including configuration information for the third IAB node.

In an embodiment, wherein the BH related information further comprises information on an identity of a BH radio link control (RLC) channel and information on a next-hop BAP address, wherein the configuration information further comprises information indicating a type of traffic as a BAP control PDU, information on an egress BH channel for transmitting the traffic, and information indicating the non-F1-terminating topology.

In an embodiment, the first IAB node further comprising: transmit, to the second IAB node, a request message to revoke traffics served by the second IAB node; and receive, from the second IAB donor node, a response message for the request message, wherein the request message includes an identity of the traffics and BH information related the non-F1-terminating topology including a BH information index, wherein the response message includes an identity of traffics to be revoked and BH information related the non-F1-terminating topology to be revoked including a backhaul information index.

In an embodiment, the first IAB node further comprising: receive, from the second IAB donor node, a request message to revoke traffics served by the IAB node; and transmit, to the second IAB donor node, a response message for the request message, wherein the request message includes at least one of an identity of the traffics or BH information related the non-F1-terminating topology including a backhaul information index, wherein the response message includes at least one of an identity of traffics to be revoked or BH information related the non-F1-terminating topology to be revoked including a backhaul information index.

In an embodiment, the first IAB node further comprising: transmit, to the second IAB donor node, threshold configuration information, wherein the threshold configuration information includes a threshold value of a buffer size to determine whether congestion occurs.

In an embodiment, a second integrated access and backhaul (IAB) node which is a non-F1-terminating IAB donor node in wireless communication, the second IAB node comprising: a transceiver; and at least one processor coupled with the transceiver and configured to: transmit, to a first IAB node which is a F1-terminating IAB donor node, a first message including backhaul (BH) related information for at least one IAB node of a non-F1-terminating topology associated with the second IAB node, wherein the first message is for transmitting the configuration information to a third IAB node which is an IAB node connected with the first IAB node and the second IAB node.

In an embodiment, wherein the BH related information further comprises information on an identity of a BH radio link control (RLC) channel and information on a next-hop BAP address, wherein the configuration information further comprises information indicating a type of traffic as a BAP control PDU, information on an egress BH channel for transmitting the traffic, and information indicating the non-F1-terminating topology.

In an embodiment, a second IAB node further comprising: receive, from the second IAB node, a request message to revoke traffics served by the second IAB node; and transmit, to the second IAB donor node, a response message for the request message, wherein the request message includes an identity of the traffics and BH information related the non-F1-terminating topology including a BH information index, wherein the response message includes an identity of traffics to be revoked and BH information related the non-F1-terminating topology to be revoked including a backhaul information index.

In an embodiment, a second IAB node further comprising: transmit, to the second IAB donor node, a request message to revoke traffics served by the IAB node; and receive, the second IAB donor node, a response message for the request message, wherein the request message includes at least one of an identity of the traffics or BH information related the non-F1-terminating topology including a backhaul information index, wherein the response message includes at least one of an identity of traffics to be revoked or BH information related the non-F1-terminating topology to be revoked including a backhaul information index.

In an embodiment, a second IAB node further comprising: Receive, from the second IAB donor node, threshold configuration information, wherein the threshold configuration information includes a threshold value of a buffer size to determine whether congestion occurs. Those skilled in the art may realize that the present disclosure may be implemented in other specific forms without changing the technical idea or basic features of the present disclosure. Therefore, it should be understood that, the above-described embodiments are merely examples and not limitative. The scope of the present disclosure is defined by the appended claims rather than the detailed description. Therefore, it should be understood that all modifications or changes derived from the meaning and scope of the appended claims and their equivalents fall within the scope of the present disclosure.

In the above-described embodiments of the present disclosure, all operations and messages may be selectively performed or may be omitted. In addition, the operations in each embodiment do not need to be performed sequentially, and the order of operations may vary. Messages do not need to be transmitted in order, and the transmission order of messages may change. Each operation and transfer of each message can be performed independently.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a first integrated access and backhaul (IAB) node which is a F1-terminating IAB donor node in a wireless communication system, the method comprising:
   receiving, from a second IAB node which is a non-F1-terminating IAB donor node, a first message including backhaul (BH) related information for a non-F1-terminating topology associated with the second IAB node, wherein the BH related information includes at least one of information on an identity of a BH radio link control (RLC) channel, or information on a next-hop backhaul adaptation protocol (BAP) address; and
   transmitting, to a third IAB node which is an IAB node connected with the first IAB node and the second IAB node, a second message including configuration information for the third IAB node, wherein the configuration information includes at least one of information indicating a type of traffic as a BAP control protocol data unit (PDU), information on an egress BH channel identity, or information indicating the non-F1-terminating topology.

2. The method of claim 1, further comprising:
   transmitting, to the second IAB node, a request message to release traffics served by the second IAB node; and
   receiving, from the second IAB node, a response message as a response to the request message,
   wherein the request message includes at least one of indexes of the traffics or indexes of BH information, and
   wherein the response message includes information for identifying released traffics.

3. The method of claim 1, further comprising:
   receiving, from the second IAB node, a request message to release traffics served by the IAB node; and
   transmitting, to the second IAB node, a response message as a response to the request message,
   wherein the request message includes at least one of an identity indexes of the traffics or indexes of BH information, and
   wherein the response message includes information for identifying released traffics.

4. The method of claim 1, further comprising:
   transmitting, to the second IAB node, threshold configuration information,
   wherein the threshold configuration information includes a threshold value of a buffer size to determine a congestion.

5. A method performed by a second integrated access and backhaul (IAB) node which is a non-F1-terminating IAB donor node in a wireless communication system, the method comprising:
   transmitting, to a first IAB node which is a F1-terminating IAB donor node, a first message including backhaul (BH) related information for a non-F1-terminating topology associated with the second IAB node, wherein the BH related information includes at least one of information on an identity of a BH radio link control (RLC) channel, or information on a next-hop backhaul adaptation protocol (BAP) address,
   wherein the first message is for transmitting configuration information to a third IAB node which is an IAB node connected with the first IAB node and the second IAB node, and wherein the configuration information includes at least one of information indicating a type of traffic as a BAP control protocol data unit (PDU), information on an egress BH channel identity, or information indicating the non-F1-terminating topology.

6. The method of claim 5, further comprising:
   receiving, from the second IAB node, a request message to release traffics served by the second IAB node; and
   transmitting, to the second IAB node, a response message as a response to the request message,
   wherein the request message includes at least one of indexes of the traffics or indexes of BH information, and
   wherein the response message includes information for identifying released traffics.

7. The method of claim 5, further comprising:
   transmitting, to the second IAB node, a request message to release traffics served by the IAB node; and
   receiving, the second IAB node, a response message as a response to the request message,
   wherein the request message includes at least one of indexes of the traffics or indexes of BH information, and
   wherein the response message includes information for identifying released traffics.

8. The method of claim 5, further comprising:
   receiving, from the second IAB node, threshold configuration information,
   wherein the threshold configuration information includes a threshold value of a buffer size to determine a congestion.

9. A first integrated access and backhaul (IAB) node which is a F1-terminating IAB donor node, the first IAB node comprising:
   at least one transceiver;
   at least one processor communicatively coupled to the at least one transceiver; and
   at least one memory, communicatively coupled to the at least one processor, storing instructions executable by the at least one processor individually or in any combination to cause the first IAB node to:
      receive, from a second IAB node which is a non-F1-terminating IAB donor node, a first message including backhaul (BH) related information for a non-F1- terminating topology associated with the second IAB node, wherein the BH related information includes at least one of information on an identity of a BH radio link control (RLC) channel, or information on a next-hop backhaul adaptation protocol (BAP) address; and transmit, to a third IAB node which is an IAB node connected with the first IAB node and the second IAB node, a second message including configuration information for the third IAB node, wherein the configuration information includes at least one of information indicating a type of traffic as a BAP control protocol data unit (PDU), information on an egress BH channel identity, or information indicating the non-F1-terminating topology.

10. The first IAB node of claim 9,
wherein the instructions further cause the first IAB node to:
transmit, to the second IAB node, a request message to release traffics served by the second IAB node; and
receive, from the second IAB node, a response message as a response to the request message,
wherein the request message includes at least one of indexes of the traffics or indexes of BH information, and
wherein the response message includes information for identifying released traffics.

11. The first IAB node of claim 9,
wherein the instructions further cause the first IAB node to:
receive, from the second IAB node, a request message to release traffics served by the IAB node; and
transmit, to the second IAB node, a response message as a response to the request message,
wherein the request message includes at least one of indexes of the traffics or indexes of BH information, and
wherein the response message includes information for identifying released traffics.

12. The first IAB node of claim 9,
wherein the instructions further cause the first IAB node to:
transmit, to the second IAB node, threshold configuration information, and
wherein the threshold configuration information includes a threshold value of a buffer size to determine a congestion.

13. A second integrated access and backhaul (IAB) node which is a non-F1-terminating IAB donor node, the second IAB node comprising:
at least one transceiver;
at least one processor communicatively coupled to the at least one transceiver; and
at least one memory, communicatively coupled to the at least one processor, storing instructions executable by the at least one processor individually or in any combination to cause the second IAB node to:
transmit, to a first IAB node which is a F1-terminating IAB donor node, a first message including backhaul (BH) related information for a non-F1-terminating topology associated with the second IAB node, wherein the BH related information includes information on an identity of a BH radio link control (RLC) channel, or information on a next-hop backhaul adaptation protocol (BAP) address,
wherein the first message is for transmitting configuration information to a third IAB node which is an IAB node connected with the first IAB node and the second IAB node, and wherein the configuration information includes information indicating a type of traffic as a BAP control protocol data unit (PDU), information on an egress BH channel identity, or information indicating the non-F1-terminating topology.

14. The second IAB node of claim 13,
wherein the instructions further cause the second IAB node to:
receive, from the second IAB node, a request message to release traffics served by the second IAB node; and
transmit, to the second IAB node, a response message as a response to the request message,
wherein the request message includes at least one of indexes of the traffics or indexes of BH information, and
wherein the response message includes information for identifying released traffics.

15. The second IAB node of claim 13,
wherein the instructions further cause the second IAB node to:
transmit, to the second IAB node, a request message to release traffics served by the IAB node; and
receive, the second IAB node, a response message as a response to the request message,
wherein the request message includes at least one of indexes of the traffics or indexes of BH information, and
wherein the response message includes information for identifying released traffics.

16. The second IAB node of claim 13,
wherein the instructions further cause the second IAB node to:
receive, from the second IAB node, threshold configuration information, and
wherein the threshold configuration information includes a threshold value of a buffer size to determine a congestion.

* * * * *